United States Patent
Ohishi

(10) Patent No.: US 6,204,725 B1
(45) Date of Patent: Mar. 20, 2001

(54) CIRCUIT FOR DEMODULATING DIGITAL SIGNAL UNDERGOING DIFFERENT MODULATION SCHEMES

(75) Inventor: Syouji Ohishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/487,877

(22) Filed: Jan. 20, 2000

(30) Foreign Application Priority Data

Jan. 21, 1999 (JP) ................................................. 11-013430

(51) Int. Cl.[7] ............................ H03D 3/00; H04L 27/227
(52) U.S. Cl. ........................ 329/304; 239/308; 239/309; 239/310; 375/326; 375/328; 375/329; 375/332; 375/333; 375/346
(58) Field of Search ................................... 329/304–310; 375/324–333, 346

(56) References Cited

U.S. PATENT DOCUMENTS

| | | | |
|---|---|---|---|
| 3,575,554 | * 4/1971 | Schmidt | 178/69.5 |
| 4,313,205 | * 1/1982 | Rhodes | 375/86 |
| 4,585,998 | * 4/1986 | Veillard | 329/50 |
| 4,713,689 | * 12/1987 | Veillard | 358/146 |
| 5,117,427 | * 5/1992 | Miyake et al. | 371/37.4 |
| 5,513,246 | * 4/1996 | Jonsson et al. | 379/60 |
| 5,561,468 | * 10/1996 | Bryan et al. | 348/469 |
| 5,883,929 | * 3/1999 | Wang et al. | 375/367 |
| 6,031,880 | * 2/2000 | Li et al. | 375/326 |

\* cited by examiner

*Primary Examiner*—David Mis
(74) *Attorney, Agent, or Firm*—Arent, Fox, Kintner, Plotkin & Kahn, PLLC

(57) ABSTRACT

A circuit for demodulating a signal having a temporal mixture of different modulation schemes applied thereto includes a synchronization-word-detection unit which detects synchronization words included in the signal, and generates first and second position signals, based on the detected synchronization words, indicative of respective predetermined positions in the signal, a first selection unit which selects the first position signals during a first period, and selects the first position signals and the second position signals during a second period, and a carrier-reproduction unit which carries out frequency capturing during the first period by using the first position signals selected by the first selection unit, and carries out phase capturing during the second period by using the first position signals and the second position signals selected by the first selection unit, thereby reproducing a carrier.

13 Claims, 31 Drawing Sheets

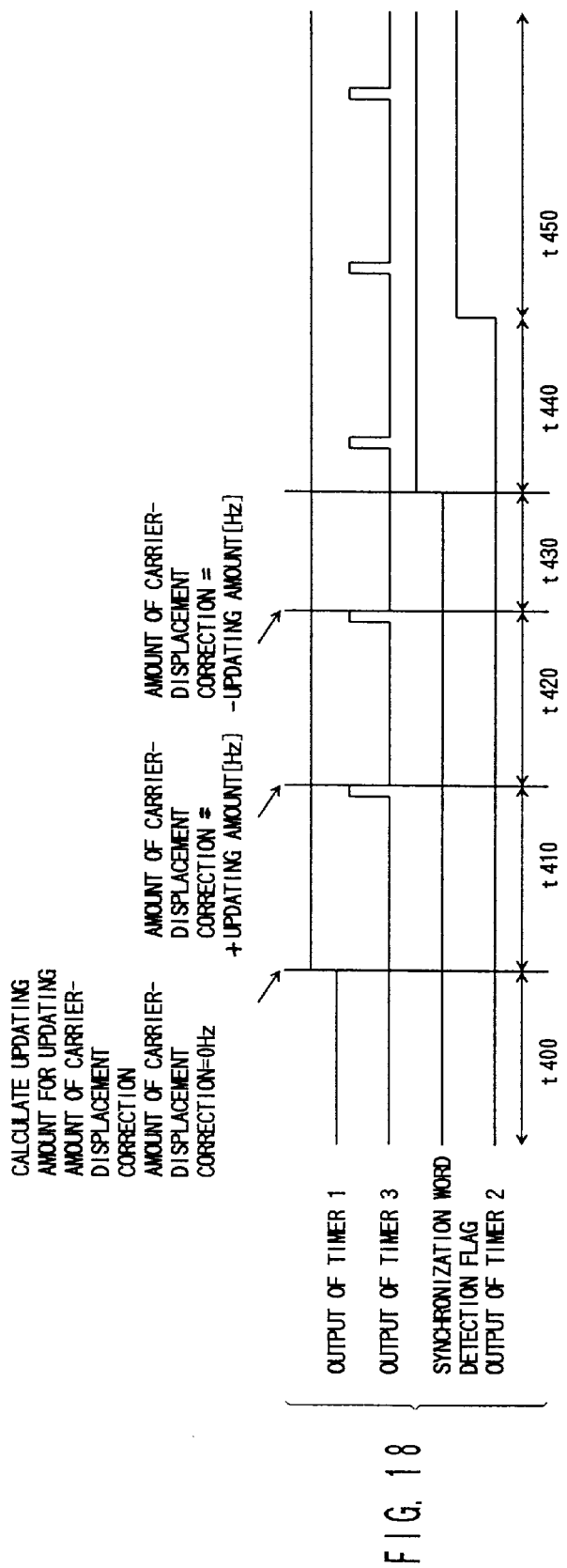
F I G. 18

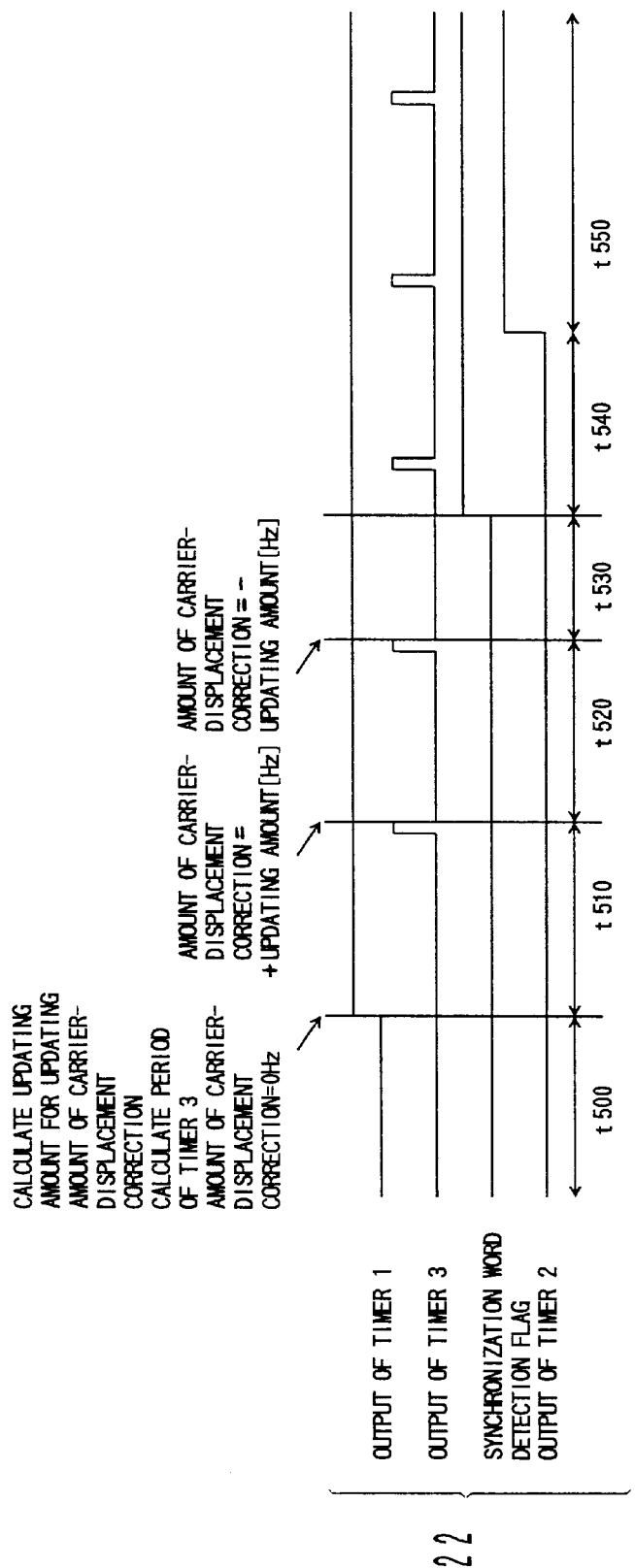

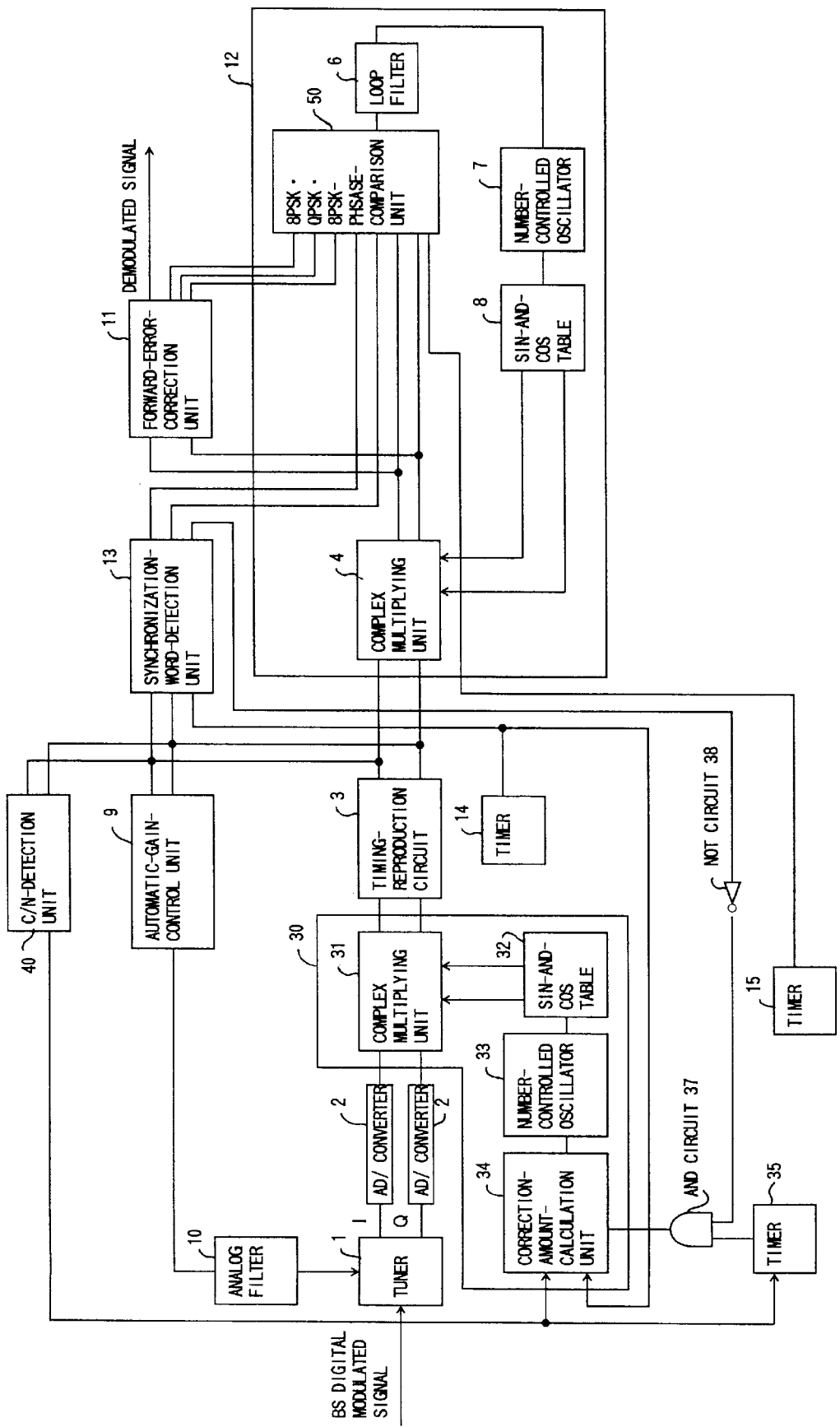
F I G. 2 3

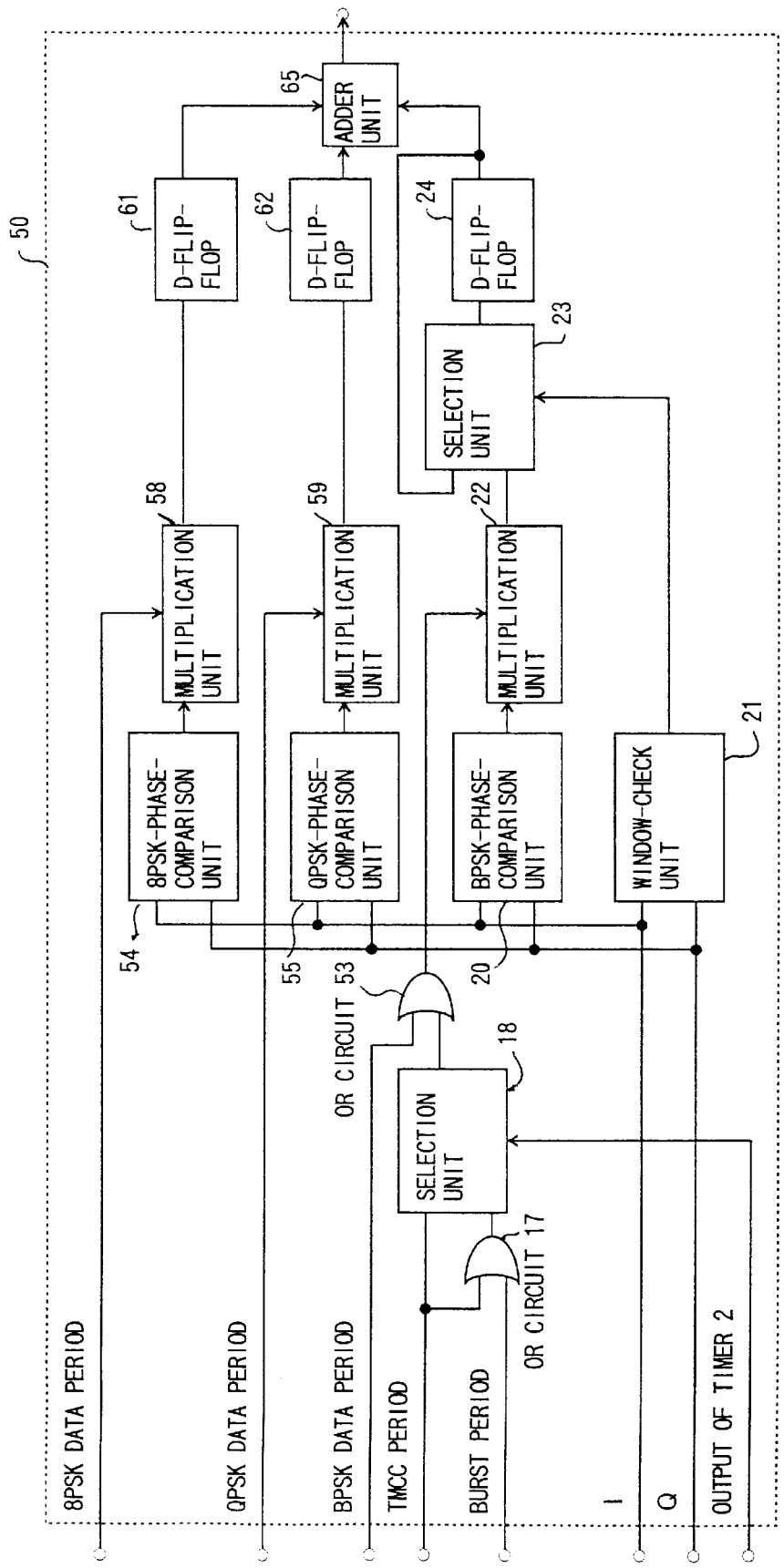
F I G. 2 4

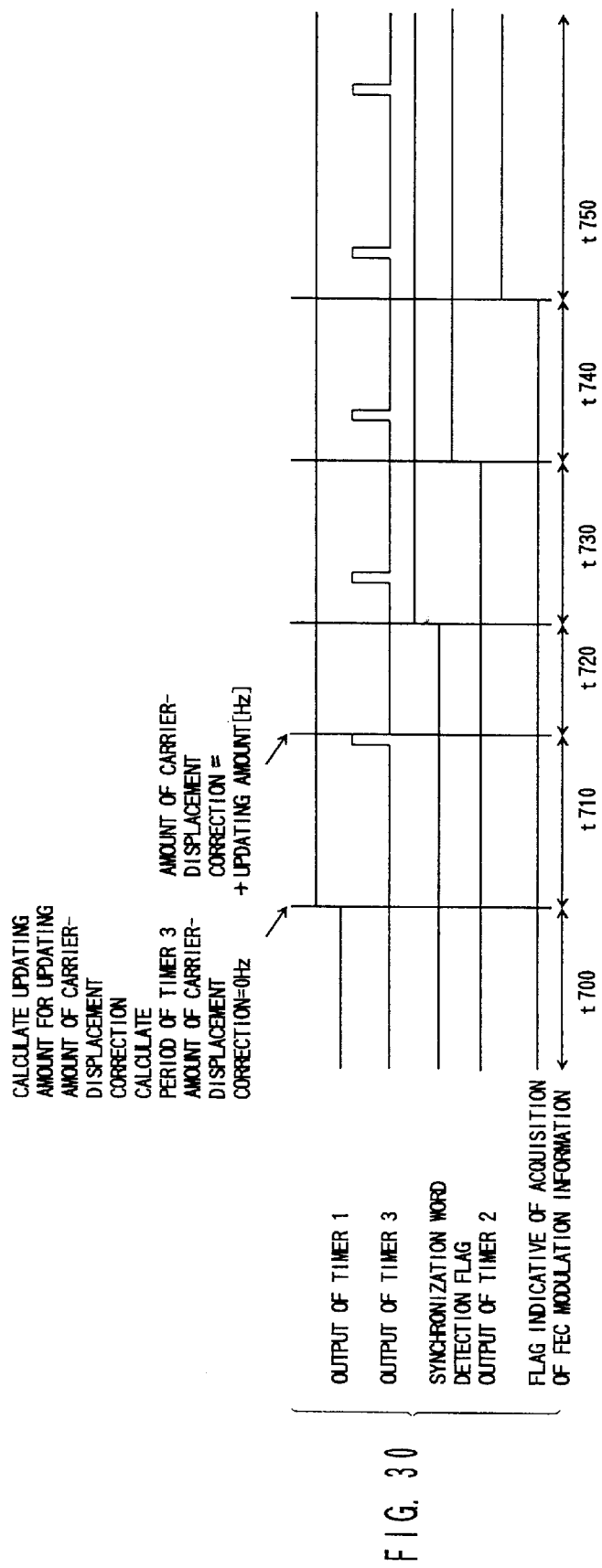

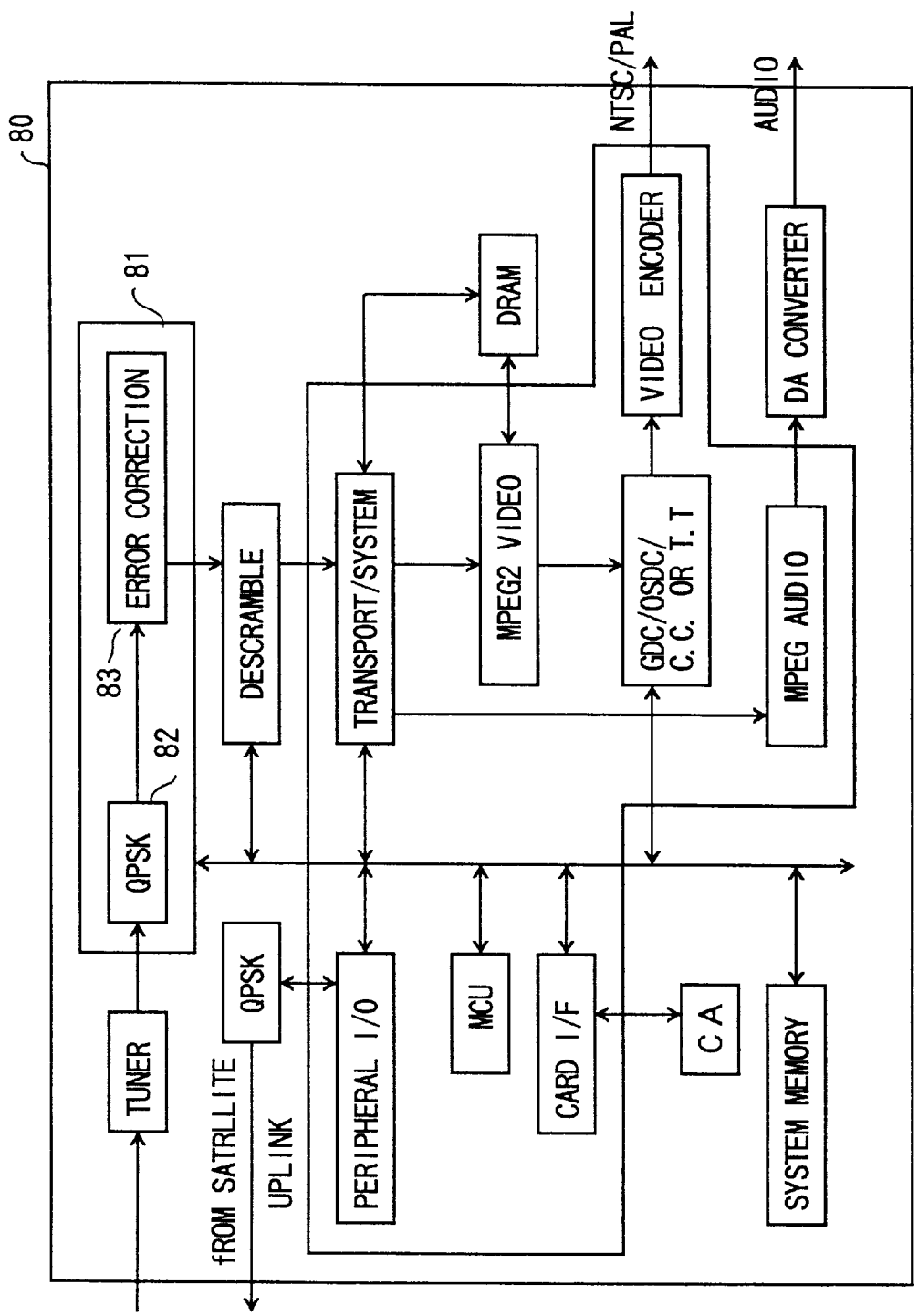

CIRCUIT FOR DEMODULATING DIGITAL SIGNAL UNDERGOING DIFFERENT MODULATION SCHEMES

BACKGROUND OF THE INVENTION

1. Field of the Invention

The present invention generally relates to a method and a circuit for demodulating digital signals, and particularly relates to a method and a circuit for demodulating digital signals which are a mixture of different signals having different modulation schemes applied thereto.

2. Description of the Related Art

When a signal having a temporal mixture of different modulation schemes such as BPSK, QPSK, and 8PSK applied thereto is to be demodulated, a digital-signal demodulation circuit needs to be designed for such a purpose.

FIG. 1 is a block diagram of an example of a digital-signal demodulation circuit which demodulates a signal that has a temporal mixture of different modulation schemes applied thereto.

The digital-signal demodulation circuit of FIG. 1 includes a tuner 1, an A/D converter 2, a timing-reproduction circuit 3, an automatic-gain-control unit 9, an analog filter 10, a forward-error-correction unit 11, and a carrier-reproduction unit 12.

The carrier-reproduction unit 12 includes a complex multiplying unit 4, an 8PSK-phase-comparison unit 5, a loop filter 6, a number-controlled oscillator 7, and a sin-and-cos table 8.

When a signal having a temporal mixture of BPSK, QPSK, and 8PSK applied thereto is supplied, the tuner 1 performs down-conversion of the supplied signal, and attends to synchronous signal detection so as to output I and Q analog signals. The A/D converter 2 receives the I and Q analog signals from the tuner 1, and converts the analog signals to digital signals to output I and Q digital signals.

The timing-reproduction circuit 3 receives the I and Q digital signals from the A/D converter 2, and reconstructs timings of the I and Q digital signals. The complex multiplying unit 4 corrects a phase of a symbol of the I and Q digital signals supplied from the timing-reproduction circuit 3 based on signals indicating the amount of phase correction. Such signals indicating the amount of phase correction are provided from the sin-and-cos table 8, which will be described later. The 8PSK-phase-comparison unit 5 receives the I and Q digital signals having the phase thereof corrected by the complex multiplying unit 4, and detects a phase difference of the symbol of the I and Q digital signals.

The digital-signal demodulation circuit of FIG. 1 reproduces a signal having a temporal mixture of BPSK, QPSK, and 8PSK by using the 8PSK-phase-comparison unit 5. In the following, a description will be given with regard to how to reproduce a signal having a temporal mixture of BPSK, QPSK, and 8PSK by using the 8PSK-phase-comparison unit 5.

FIG. 2 is an illustrative drawing for explaining how to reproduce a signal having a temporal mixture of BPSK, QPSK, and 8PSK by use of an 8PSK-phase-comparison unit.

As shown in FIG. 2, an I–Q plane is divided into eight areas. Each of the eight areas is further divided by half, one half representing positive polarization and the other half representing negative polarization.

When an input symbol x is located in the area (a) shown in FIG. 2, for example, an angle between a vector a0 and a vector x0 extending from the origin to the symbol x can be regarded as a phase difference. Further, a polarization that is predetermined for a given area as shown in FIG. 2 is output as a polarization of this area. When an input symbol is located in another area, a phase difference can be determined in the same fashion.

With reference to FIG. 1 again, the loop filter 6 applies smoothing to the signal supplied from the 8PSK-phase-comparison unit 5 where the signal indicates the phase difference as previously described. The loop filter 6 outputs the smoothed phase-difference signal. The number-controlled oscillator 7 supplies an oscillating signal to the sin-and-cos table 8 such that a frequency of the oscillating signal varies depending on the smoothed phase-difference signal. Based on the supplied oscillating signal, the sin-and-cos table 8 outputs signals indicative of the amount of phase correction that is to be made to the I and Q digital signals. These output signals are supplied to the complex multiplying unit 4.

The automatic-gain-control unit 9 receives the I and Q digital signals from the complex multiplying unit 4, and generates a signal indicative of size of the symbol of the I and Q digital signals. The generated signal is supplied to the tuner 1 via the analog filter 10.

The digital-signal demodulation circuit of FIG. 1 uses a feedback loop comprised of the complex multiplying unit 4, the 8PSK-phase-comparison unit 5, the loop filter 6, the number-controlled oscillator 7, and the sin-and-cos table 8, thereby attaining carrier reproduction. Further, another feedback loop is implemented by the tuner 1, the A/D converter 2, the timing-reproduction circuit 3, the complex multiplying unit 4, the automatic-gain-control unit 9, and the analog filter 10, and serves to control levels of the input signals to the complex multiplying unit 4.

In this manner, the complex multiplying unit 4 outputs signals that have been subjected to timing reconstruction, carrier reproduction, and input-level control, and these output signals are supplied to the forward-error-correction unit 11 to be subjected to error correction. After the error correction, signals are output as demodulated signals.

In the digital-signal demodulation circuit of FIG. 1, the 8PSK-phase-comparison unit 5 processes any signal by treating it as an 8PSK signal when detecting a phase difference of a symbol of I and Q digital signals. Because of this, a lower limit of a C/N ratio for carrier reproduction is around 10 dB, which is determined by use of 8PSK. In general, however, a lower limit of a C/N ratio for carrier reproduction is about –1 to 0 dB for 8PSK and 2 to 3 dB for QPSK. Despite these lower limits, carrier reproduction may become impossible for BPSK and QPSK when a C/N ratio falls below 10 dB in the digital-signal demodulation circuit of FIG. 1.

Accordingly, there is a need for a method and a device for digital-signal demodulation which can demodulate a signal having a temporal mixture of different modulation schemes even when a C/N ratio is relatively low.

SUMMARY OF THE INVENTION

Accordingly, it is a general object of the present invention to provide a method and a device for digital-signal demodulation which can satisfy the need described above.

It is another and more specific object of the present invention to provide a method and a device for digital-signal demodulation which can demodulate a signal having a temporal mixture of different modulation schemes even when a C/N ratio is relatively low.

In order to achieve the above objects according to the present invention, a circuit for demodulating a signal having a temporal mixture of different modulation schemes applied thereto includes a synchronization-word-detection unit which detects synchronization words included in the signal, and generates first and second position signals, based on the detected synchronization words, indicative of respective predetermined positions in the signal, a first selection unit which selects the first position signals during a first period, and selects the first position signals and the second position signals during a second period, and a carrier-reproduction unit which carries out frequency capturing during the first period by using the first position signals selected by the first selection unit, and carries out phase capturing during the second period by using the first position signals and the second position signals selected by the first selection unit, thereby reproducing a carrier.

In the circuit described above, the frequency capturing is performed by using only the first position signals, and the phase capturing is performed after the frequency capturing by using both the first position signals and the second position signals. In this manner, the frequency capturing and the phase capturing are carried out by using appropriate position signals that are useful for the respective capturing operations. This helps to achieve proper carrier reproduction even when a C/N ratio is relatively low.

Other objects and further features of the present invention will be apparent from the following detailed description when read in conjunction with the accompanying drawings.

BRIEF DESCRIPTION OF THE DRAWINGS

FIG. 18 is a timing chart for explaining operation of the digital-signal demodulation circuit of FIG. 16;

FIG. 22 is a timing chart for explaining operation of the digital-signal demodulation circuit of FIG. 20;

FIG. 23 is a circuit diagram of a digital-signal demodulation circuit according to a sixth embodiment of the present invention;

FIG. 24 is a circuit diagram of a BPSK·QPSK·8PSK-phase-comparison unit;

FIG. 30 is a timing chart for explaining operation of the digital-signal demodulation circuit of FIG. 27; and FIG. 31 is a block diagram of a digital-signal receiver to which a digital-signal demodulation circuit of the present invention is applicable.

DESCRIPTION OF THE PREFERRED EMBODIMENTS

In the following, embodiments of the present invention will be described with reference to the accompanying drawings. In these embodiments, a description will be given with regard to a case in which a broadcasting satellite digital signal is supplied as a signal having a temporal mixture of different modulation schemes.

Figure 4:
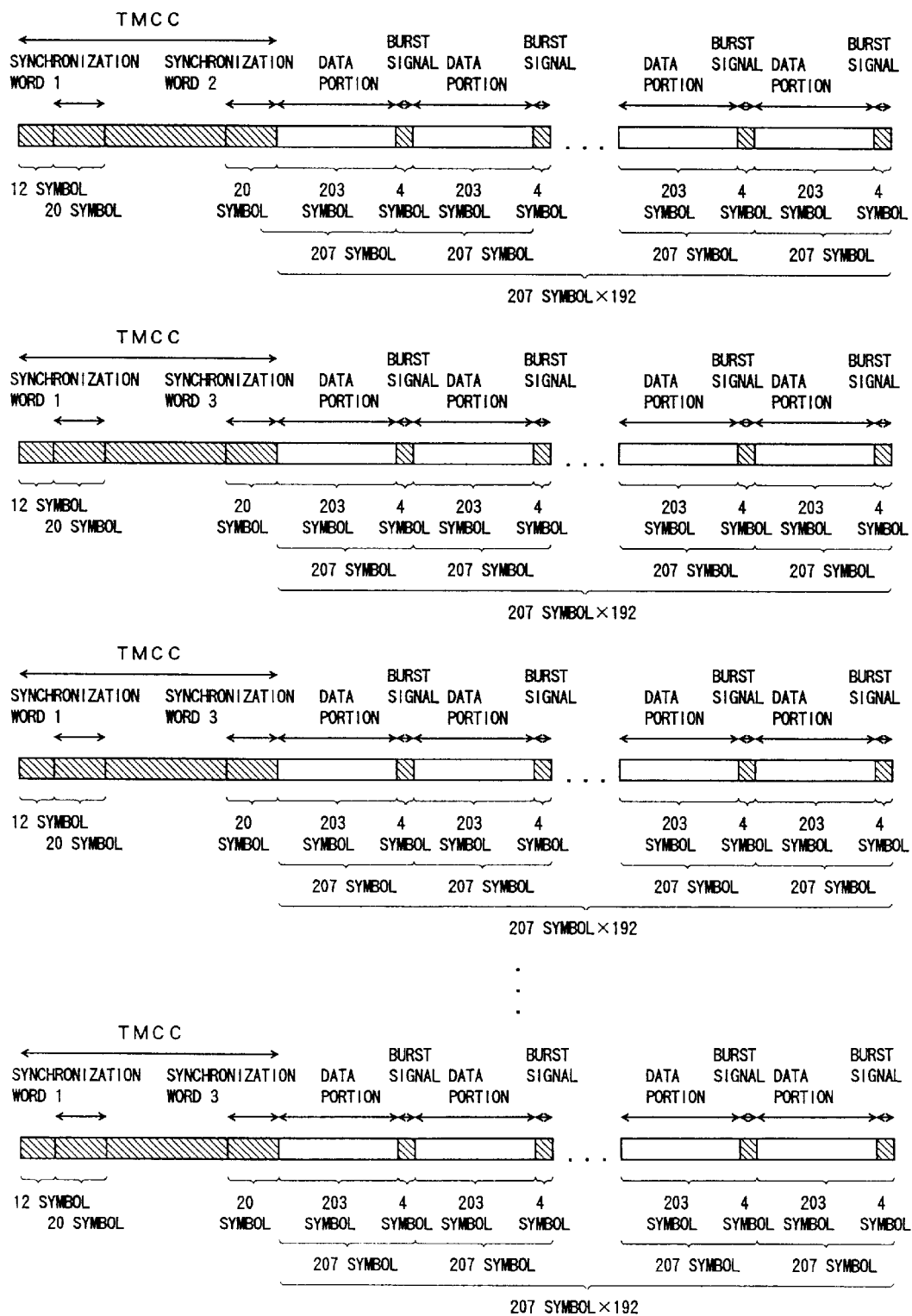
FIG. 4 is an illustrative drawing showing a super frame comprised of 319,488 symbols.

FIG. 4 is an illustrative drawing showing a super frame comprised of 319,488 symbols. One super frame is comprised of eight frames, each of which is comprised of 39,936 symbols. In each frame, hatched portions shown in FIG. 4 are subjected to BPSK modulation all the time.

These portions that are always subjected to BPSK modulation include a TMCC signal comprised of the first through 192-nd symbols of each frame, and further include a burst signal repeatedly appearing once in every 207 symbols after the end of the TMCC symbol. The burst signal is comprised of four consecutive symbols ending at every 207-th symbol.

The TMCC signal includes a synchronization word 1 extending from the 13-th symbol to the 32-nd symbol and a synchronization word 2 or 3 extending from the 173-rd symbol to the 192-nd symbol. Here, the 173-rd to 192-nd symbols of the first frame in a given super frame make up the synchronization word 2, and the 173-rd to 192-nd symbols of the remaining frames make up the synchronization word 3. In each frame, remaining portions other than the TMCC signal and the burst signals are data portions, and are subjected to BPSK, QPSK, or 8PSK modulation.

In the following, a process to be performed in response to a signal input as shown in FIG. 4 will be described with reference to each embodiment.

Figure 1:
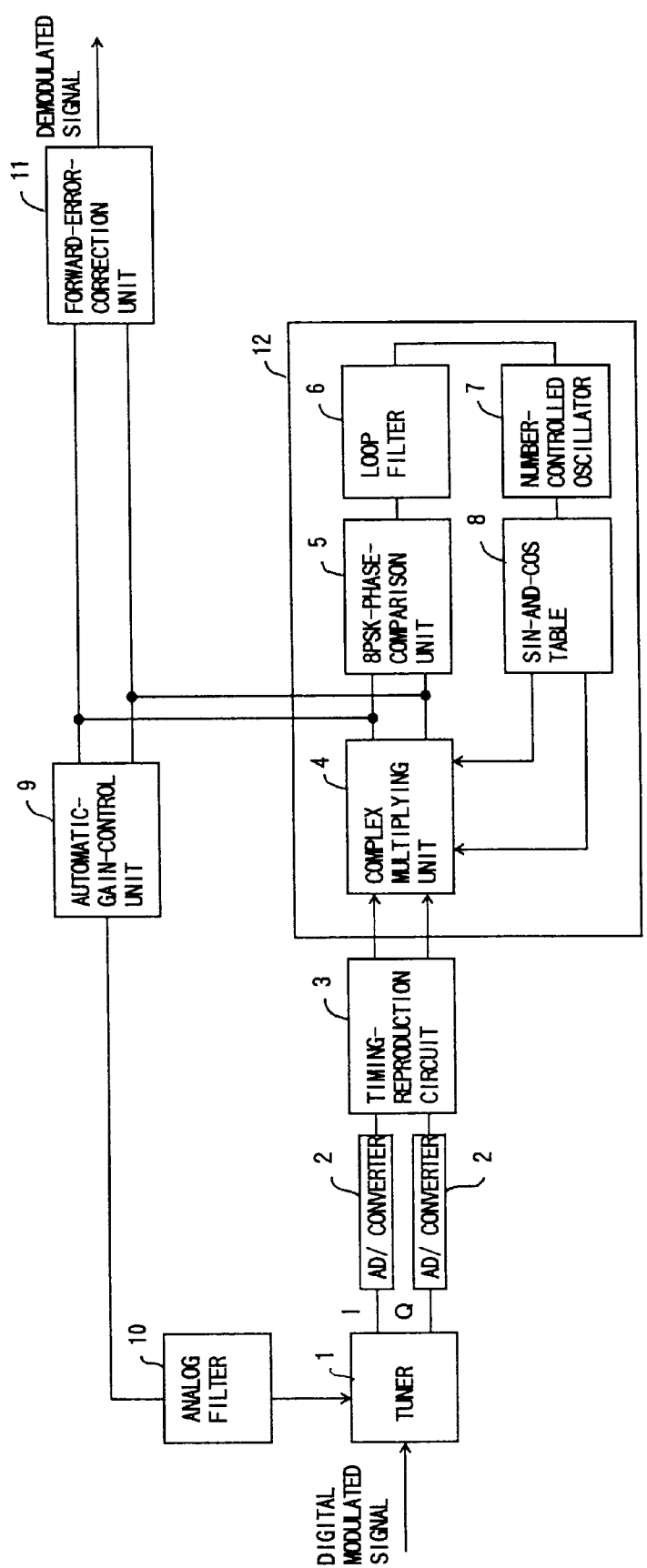
FIG. 1 is a block diagram of an example of a digital-signal demodulation circuit which demodulates a signal that has a temporal mixture of different modulation schemes applied thereto.
Figure 2:
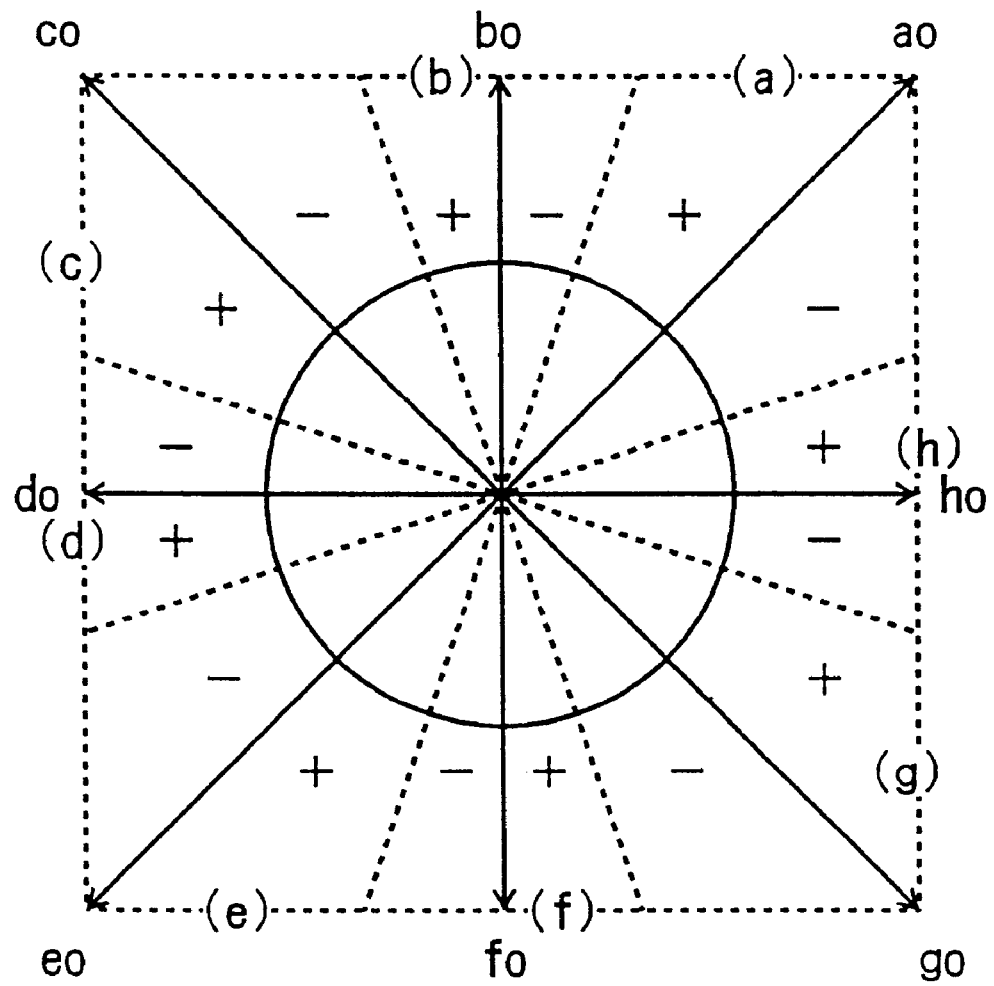
FIG. 2 is an illustrative drawing for explaining how to reproduce a signal having a temporal mixture of BPSK, QPSK, and 8PSK by use of an 8PSK-phase-comparison unit.
Figure 3:
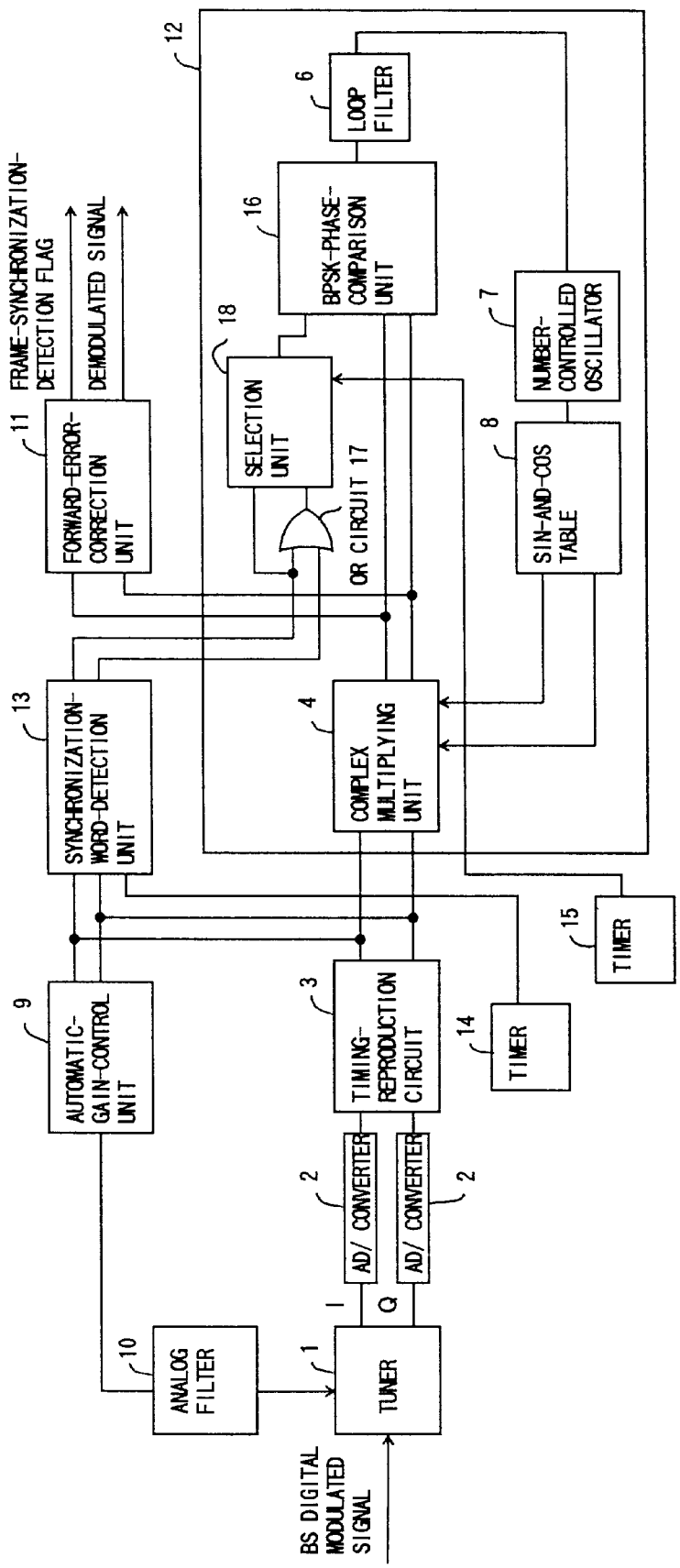
FIG. 3 is a circuit diagram of a digital-signal demodulation circuit according to a first embodiment of the present invention.

FIG. 3 is a circuit diagram of a digital-signal demodulation circuit according to a first embodiment of the present invention.

The digital-signal demodulation circuit of FIG. 3 includes the tuner 1, the A/D converter 2, the timing-reproduction circuit 3, the automatic-gain-control unit 9, the analog filter 10, the forward-error-correction unit 11, the carrier-reproduction unit 12, a synchronization-word-detection unit 13, a timer 14 (TIMER 1), and a timer 15 (TIMER 2). The carrier-reproduction unit 12 includes the complex multiplying unit 4, the loop filter 6, the number-controlled oscillator 7, the sin-and-cos table 8, a BPSK-phase-comparison unit 16, an OR circuit 17, and a selection unit 18.

Figure 5:
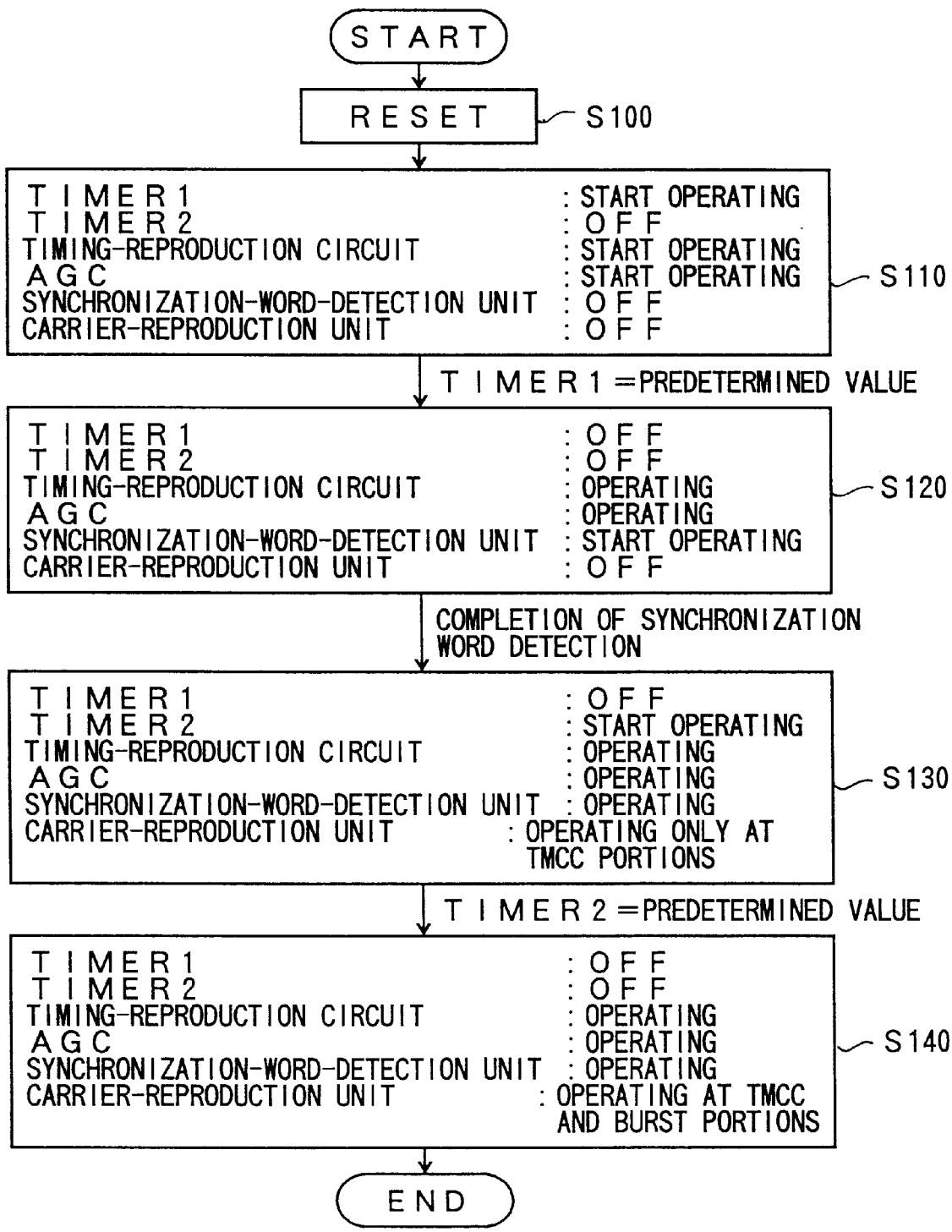
FIG. 5 is a flowchart showing operation of the digital-signal demodulation circuit of FIG. 3.
Figure 6:
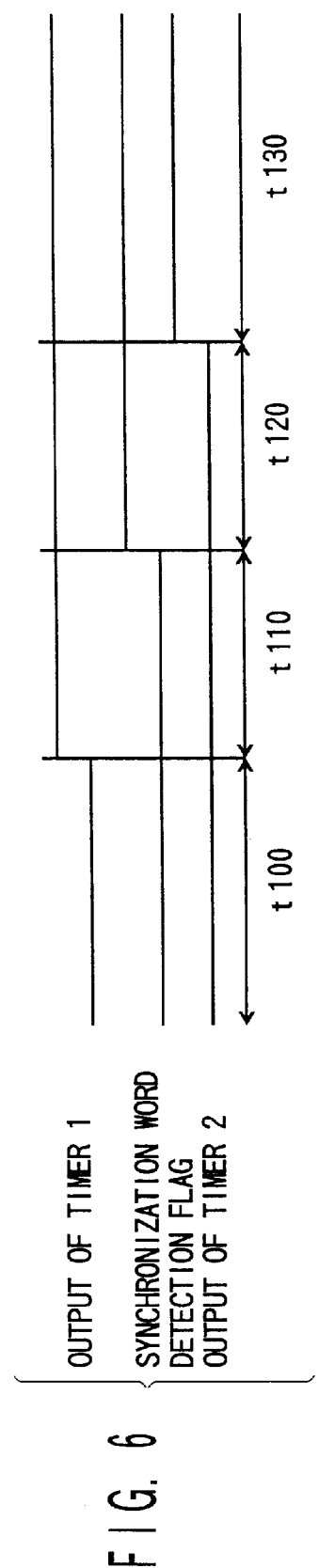
FIG. 6 is a timing chart for explaining operation of the digital-signal demodulation circuit of FIG. 3.

FIG. 5 is a flowchart showing operation of the digital-signal demodulation circuit of FIG. 3. FIG. 6 is a timing chart for explaining the operation of the digital-signal demodulation circuit of FIG. 3.

The circuit of FIG. 3 is first reset as to the entire operation thereof, and wait in a standby state (step S100). When a signal having a temporal mixture of BPSK, QPSK, and 8PSK applied thereto is supplied to the circuit, the feedback loop comprised of the tuner 1, the A/D converter 2, the timing-reproduction circuit 3, the automatic-gain-control unit 9, and the analog filter 10 attends to magnitude adjustment and timing reproduction (step S110). For this timing reproduction, the timing-reproduction circuit 3 needs to lock I and Q digital signals that have a carrier gap therebetween. This is achieved by using a Gardner-type phase comparator. This process corresponds to a time period t100 in the timing chart of FIG. 6.

The timer 14 counts time for the purpose of signaling an end of a time period during which the magnitude adjustment and timing reproduction are performed. A length of such a time period is determined in advance through simulations or the like. At the end of the time period, the timer 14 supplies an enable signal to the synchronization-word-detection unit 13. The synchronization-word-detection unit 13 receives the I and Q digital signals from the timing-reproduction circuit 3, and starts detecting the synchronization words 1 and 2. This process corresponds to a time period t110 in the timing chart of FIG. 6.

Upon detecting the synchronization words 1 and 2, the synchronization-word-detection unit 13 calculates positions of the TMCC signal and the burst signals, and supplies signals indicative of these positions to the carrier-reproduction unit 12. When this happens, the timer 15 start counting time, and supplies a LOW signal to the selection unit 18 until an end of a time period for completing frequency capturing (step S130). Such a time period is determined in advance by computer simulation or the like. Because of the LOW signal supplied from the timer 15, the selection unit 18 supplies to the BPSK-phase-comparison unit 16 the signal indicative of a position of the TMCC signal that is supplied from the synchronization-word-detection unit 13. This process corresponds to a time period t120 in the timing chart of FIG. 6.

In this manner, during the time period t120 shown in FIG. 6, an enable signal is supplied to the BPSK-phase-comparison unit 16 only at a timing corresponding to the position of the TMCC signal. The feedback loop comprised of the complex multiplying unit 4, the BPSK-phase-comparison unit 16, the loop filter 6, the number-controlled oscillator 7, and the sin-and-cos table 8 then attends to frequency capturing.

At the end of time counting, the timer 15 supplies a HIGH signal to the selection unit 18 (step S140). As a result, the selection unit 18 supplies to the BPSK-phase-comparison unit 16 the signals indicative of the positions of the TMCC signal and the burst signals as these position signals are supplied from the synchronization-word-detection unit 13. This process corresponds to a time period t130 in the timing chart of FIG. 6.

In this manner, during the time period t130 shown in FIG. 6, an enable signal is supplied to the BPSK-phase-comparison unit 16 at timings corresponding to the positions of the TMCC signal and the burst signals. In response, the feedback loop comprised of the complex multiplying unit 4, the BPSK-phase-comparison unit 16, the loop filter 6, the numbercontrolled oscillator 7, and the sin-and-cos table 8 carries out phase capturing.

During the time period t120 for frequency capturing, only the TMCC signal is utilized. During the time period t130 for phase capturing, on the other hand, both the TMCC signal and the burst signals are utilized. The reason for this will be explained below.

The circuit of the first embodiment of the present invention as shown in FIG. 3 include the feedback loop comprised of the complex multiplying unit 4, the BPSK-phase-comparison unit 16, the loop filter 6, the number-controlled oscillator 7, and the sin-and-cos table 8. Each of these units making up the loop introduces its own delay.

When signals are supplied at short intervals as are the burst signals, a burst signal ends before a result of symbol comparison for this burst signal is supplied to the complex multiplying unit 4 via the feedback loop. Thus, no feedback operation is activated. Further, since the signal output from the BPSK-phase-comparison unit 16 has increasingly higher frequency components as a carrier displacement increases, appropriate-operation may be difficult when the burst signals are supplied with a large carrier displacement.

On the other hand, the signal output from the BPSK-phase-comparison unit 16 becomes closer to a direct current as the carrier displacement decreases. Because of this, the burst signals have less adverse effects on the operation of the feedback loop. In other words, the burst signals are useful in phase capturing.

Because of the reason described above, the first embodiment of the present invention uses only the TMCC signal during the frequency capturing, and uses the TMCC signal and the burst signals during the phase capturing.

In the following, a second embodiment of the present invention will be described.

Figure 7:
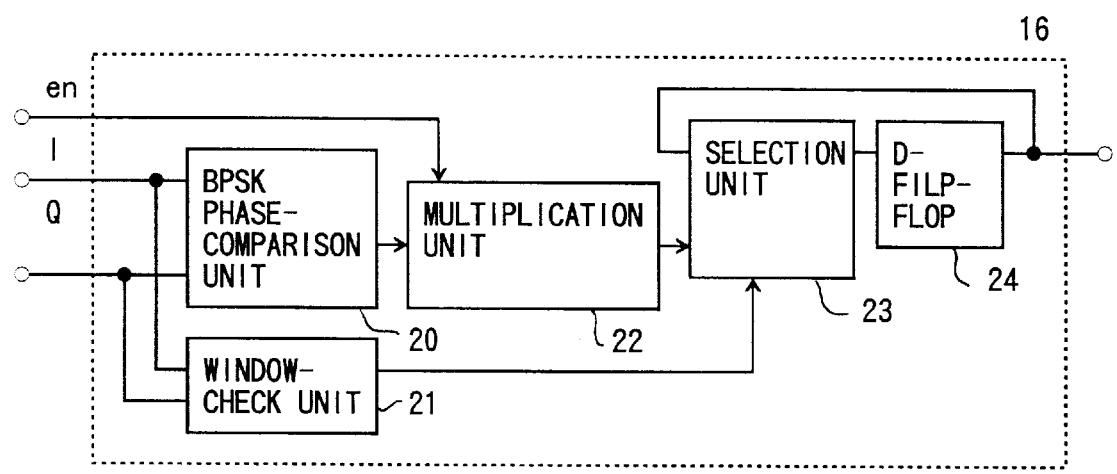
FIG. 7 is a circuit diagram of a BPSK-phase-comparison unit used in a digital-signal demodulation circuit according to a second embodiment of the present invention.
Figure 8:
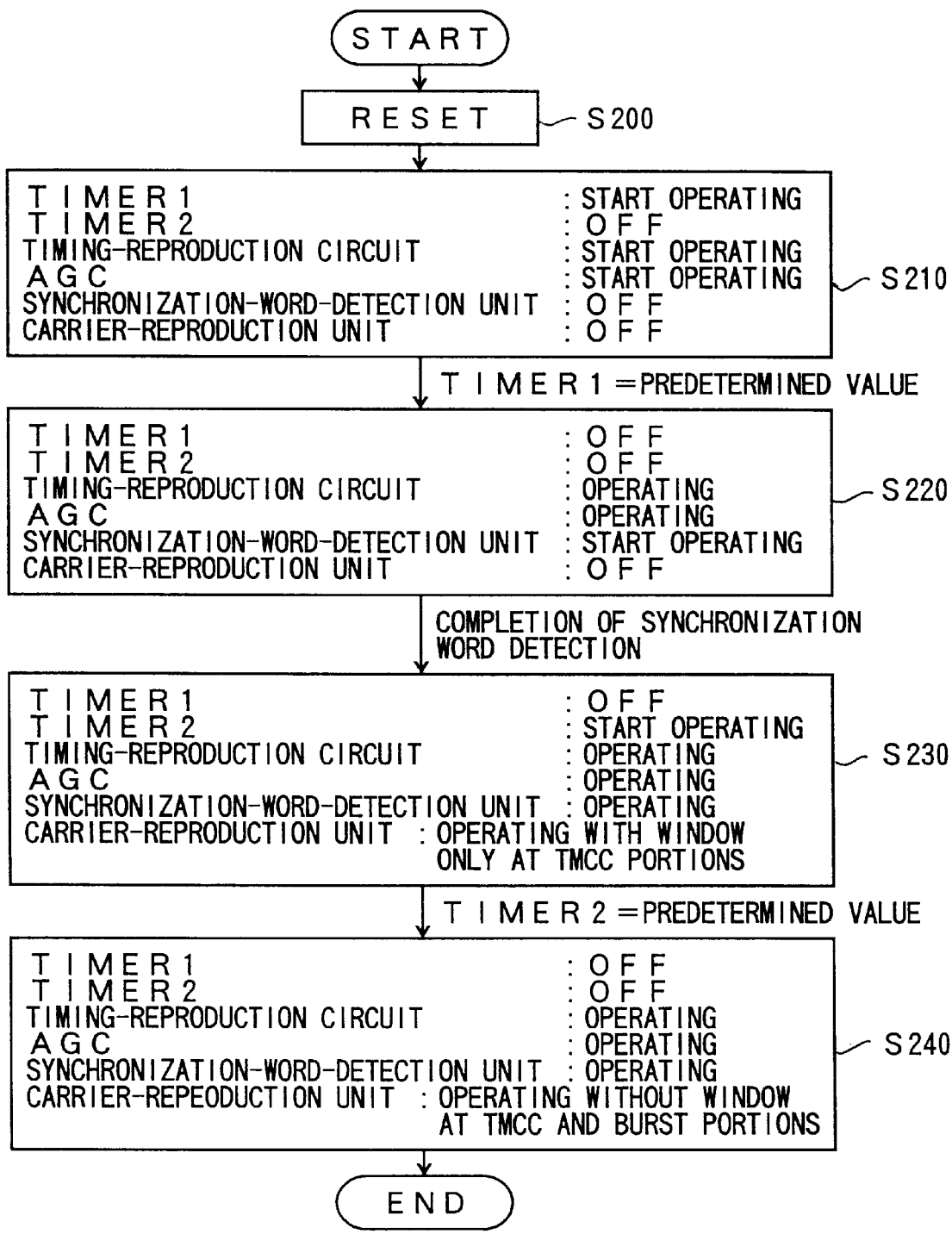
FIG. 8 is a flowchart showing operation of the digital-signal demodulation circuit of the second embodiment.
Figure 9:
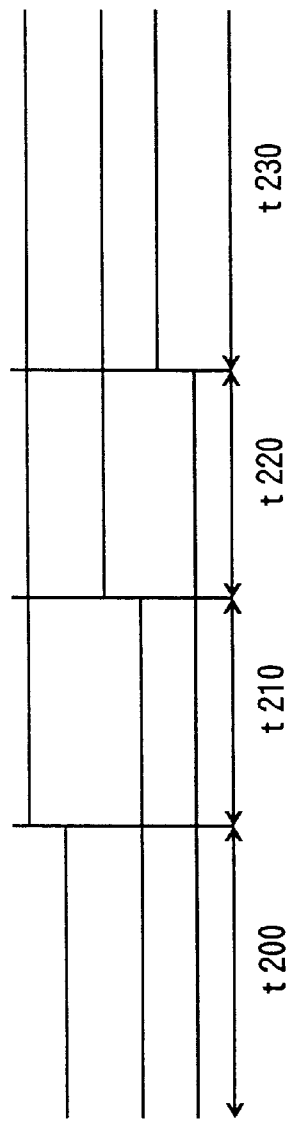
FIG. 9 is a timing chart for explaining operation of the digital-signal demodulation circuit of the second embodiment.

FIG. 7 is a circuit diagram of a BPSK-phase-comparison unit used in a digital-signal demodulation circuit according to a second embodiment of the present invention. FIG. 8 is a flowchart showing operation of the digital-signal demodulation circuit of the second embodiment. FIG. 9 is a timing chart for explaining the operation of the digital-signal demodulation circuit of the second embodiment.

The second embodiment differs from the first embodiment only in that the BPSK-phase-comparison unit 16 of the carrier-reproduction unit 12 has a different configuration from that of the first embodiment. A description of the other elements will be omitted in order to avoid a duplicate description.

The BPSK-phase-comparison unit 16 of FIG. 7 includes a BPSK-phase-comparison unit 20, a window-check unit 21, a multiplication unit 22, a selection unit 23, and a D-flip-flop 24.

In the BPSK-phase-comparison unit 16 of FIG. 7, when a high enable signal is supplied to the multiplication unit 22 from the selection unit 18, an output signal of the BPSK-phase-comparison unit 20 is supplied to the selection unit 23 via the multiplication unit 22. When a low enable signal is supplied to the multiplication unit 22 from selection unit 18, on the other hand, the output signal of the BPSK-phase-comparison unit 20 is multiplied by zero, so that a zero signal is supplied to the selection unit 23.

The window-check unit 21 receives I and Q digital signals, and checks if the I and Q digital signals fall within windows shown by hatches in FIG. *10. If they fall within the window ranges, the window-check unit 21 supplies a high signal to the selection unit 23. Otherwise, the window-check unit 21 supplies a low signal to the selection unit 23.

Accordingly, the selection unit 23 updates a value stored in the D-flip-flop 24 with the output of the BPSK-phase-comparison unit 20 if the selection unit 23 receives a high signal from the window-check unit 21 as an indication that the I and Q signals are included in the window ranges. On the other hand, the selection unit 23 keeps a value stored in the D-flip-flop 24 without any change if the selection unit 23 receives a low signal indicating that the I and Q signals are out of the window ranges.

At a step S230 in the flowchart of FIG. 8, the selection unit 18 supplies a high enable signal to the multiplication unit 22 at the TMCC-signal portion of the I and Q digital signals. Thus, symbols of the TMCC signal within the window ranges are all that is used for frequency capturing.

At a step S240 in the flowchart of FIG. 8, the selection unit 18 supplies a high enable signal to the multiplication unit 22 at the TMCC-signal portion and the burst-signal portions of the I and Q digital signals. Thus, symbols of the TMCC signal and the burst signals are all that is used for phase capturing.

In the following, the window-check unit 21 will be described more in detail.

Figure 10:
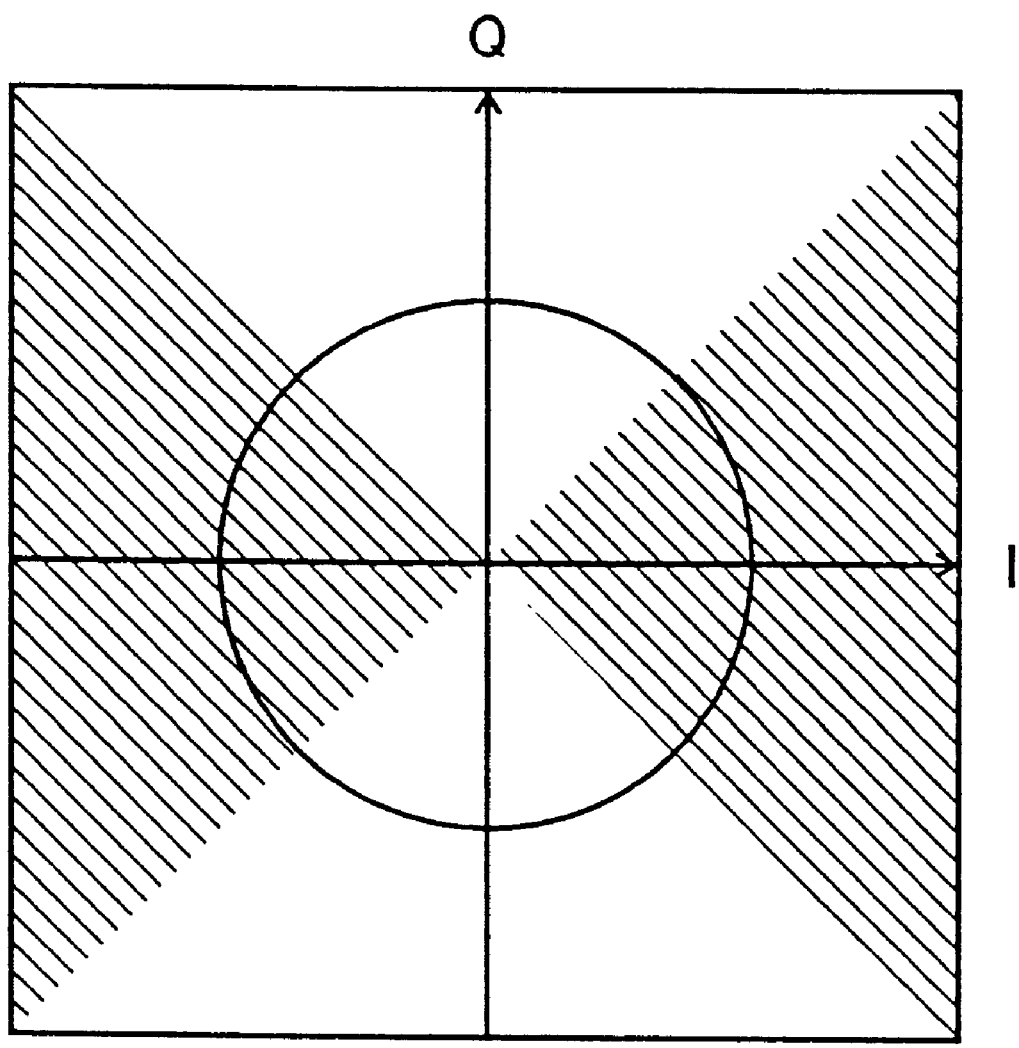
FIG. 10 is an illustrative drawing showing an example of window ranges in an I-and-Q-coordinate plane.
Figure 11:
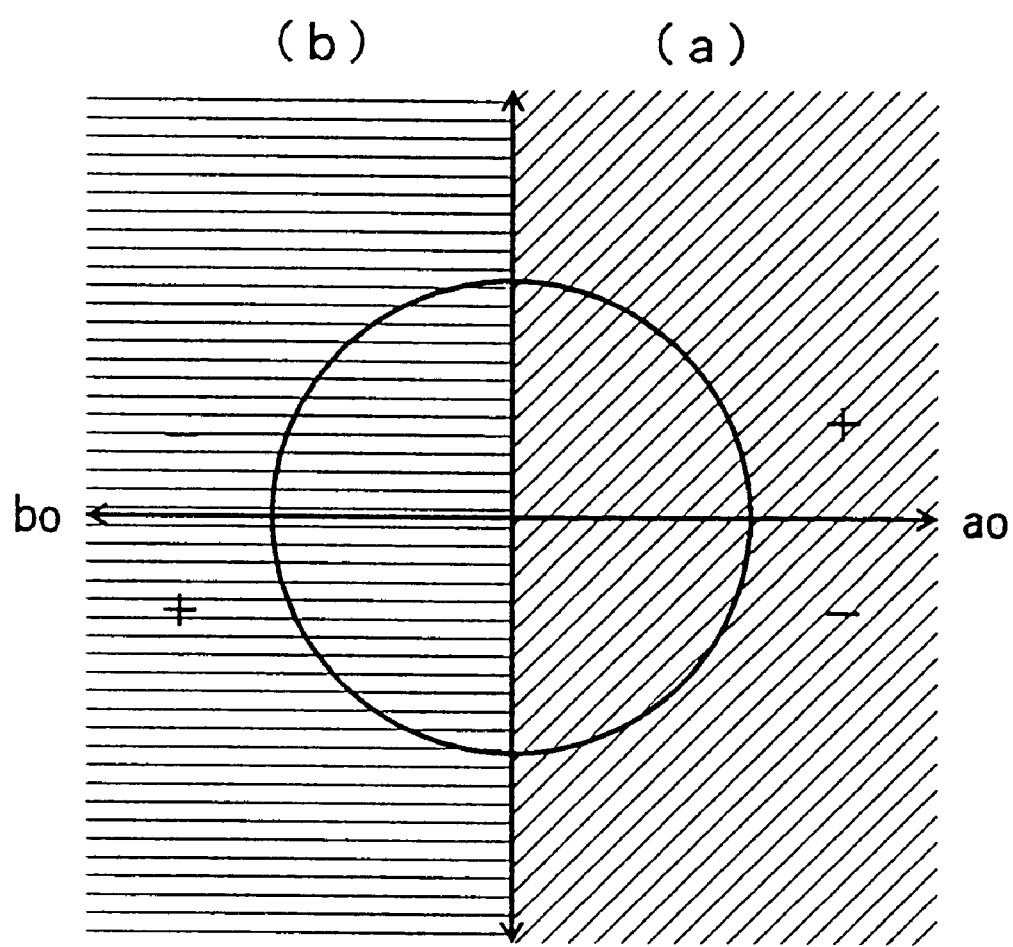
FIG. 11 is an illustrative drawing showing an example of polarization of an output signal from a BPSK-phase-comparison unit.
Figure 12:
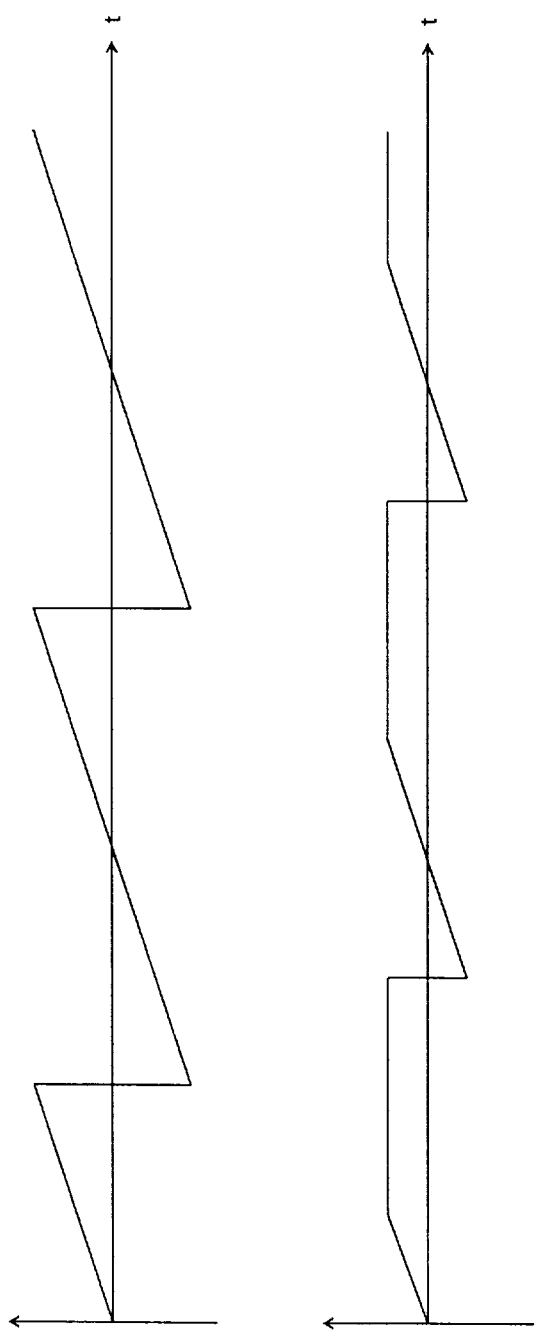
FIGS. 12A and 12B are illustrative drawings showing outputs of different BPSK-phase-comparison units.

FIG. 10 is an illustrative drawing showing an example of window ranges in the I-and-Q-coordinate plane. FIG. 11 is an illustrative drawing showing an example of polarization of an output signal from the BPSK-phase-comparison unit. FIGS. 12A and 12B are illustrative drawings showing outputs of different BPSK-phase-comparison units.

As previously described, the window-check unit 21 checks if a phase displacement of the I and Q digital signals falls within the predetermined window ranges as shown in FIG. 10. The window-check unit 21 supplies the high signal to the selection unit 23 when the I and Q digital signals have a phase difference falling within the window ranges, and supplies the low signal to the selection unit 23 when the I and Q digital signals have a phase difference out of the window ranges.

Because of such operations of the window-check unit 21 as described above, the output signal of the BPSK-phase-comparison unit 16 ends up having a signal form as shown in FIG. 12B.

If no window-check unit 21 is provided, the BPSK-phase-comparison unit 16 would have an output signal as shown in FIG. 12A. Namely, because of the polarization arrangement in the I-and-Q-coordinate plane shown in FIG. 11, the output of the BPSK-phase-comparsion unit 16 has the signal form as shown in FIG. 12A as symbols of the I and Q digital signals keep rotating in the I-and-Q-coordinate plane around the origin thereof.

In this manner, when the configuration that includes the window-check unit 21 is used, a capture range for frequency capturing or phase capturing is increased because a direct-current component is increased in the output signal in comparison with the configuration where no window-check unit 21 is provided.

In the following, a third embodiment of the present invention will be described.

Figure 13:
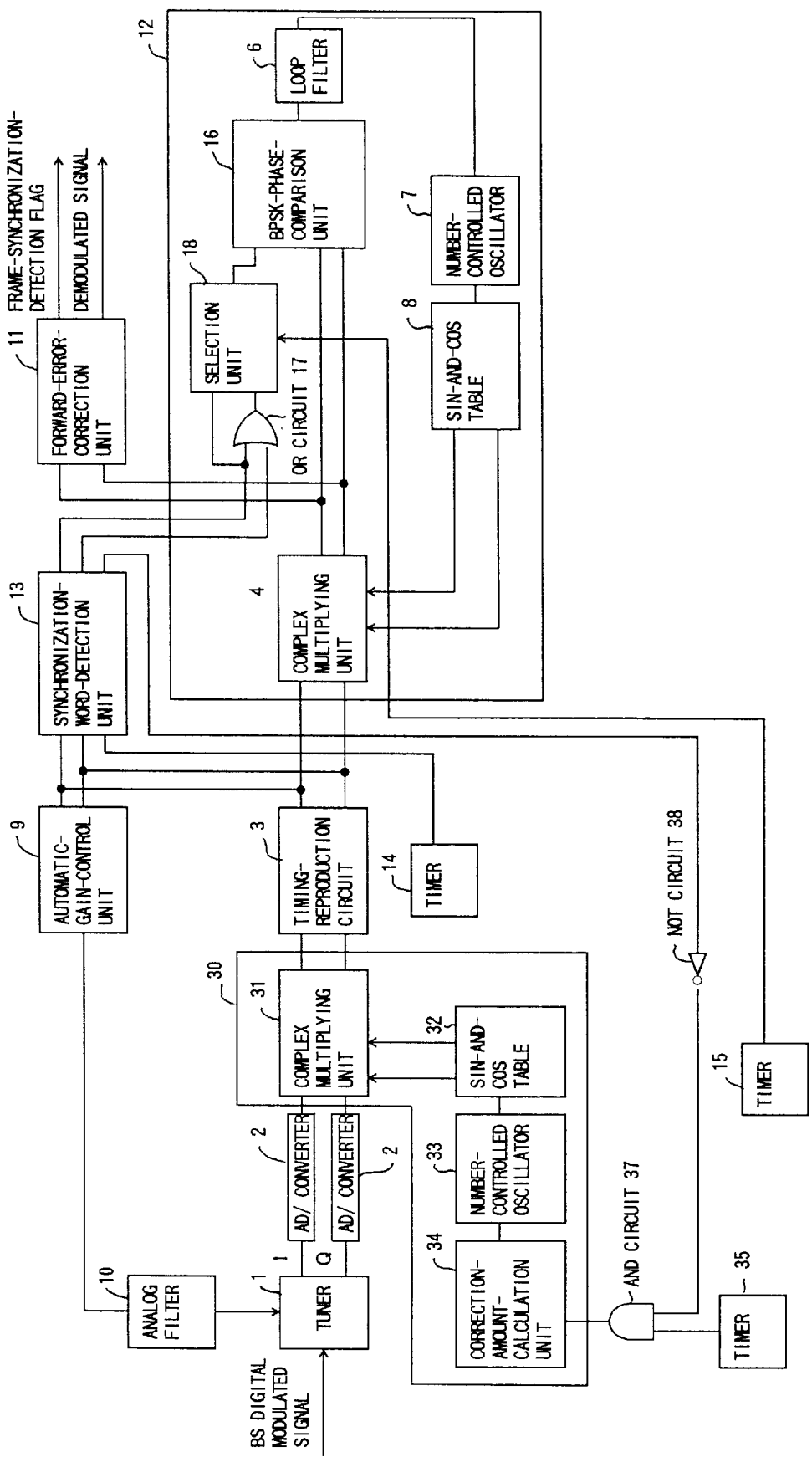
FIG. 13 is a circuit diagram of a digital-signal demodulation circuit according to a third embodiment of the present invention.
Figure 14:
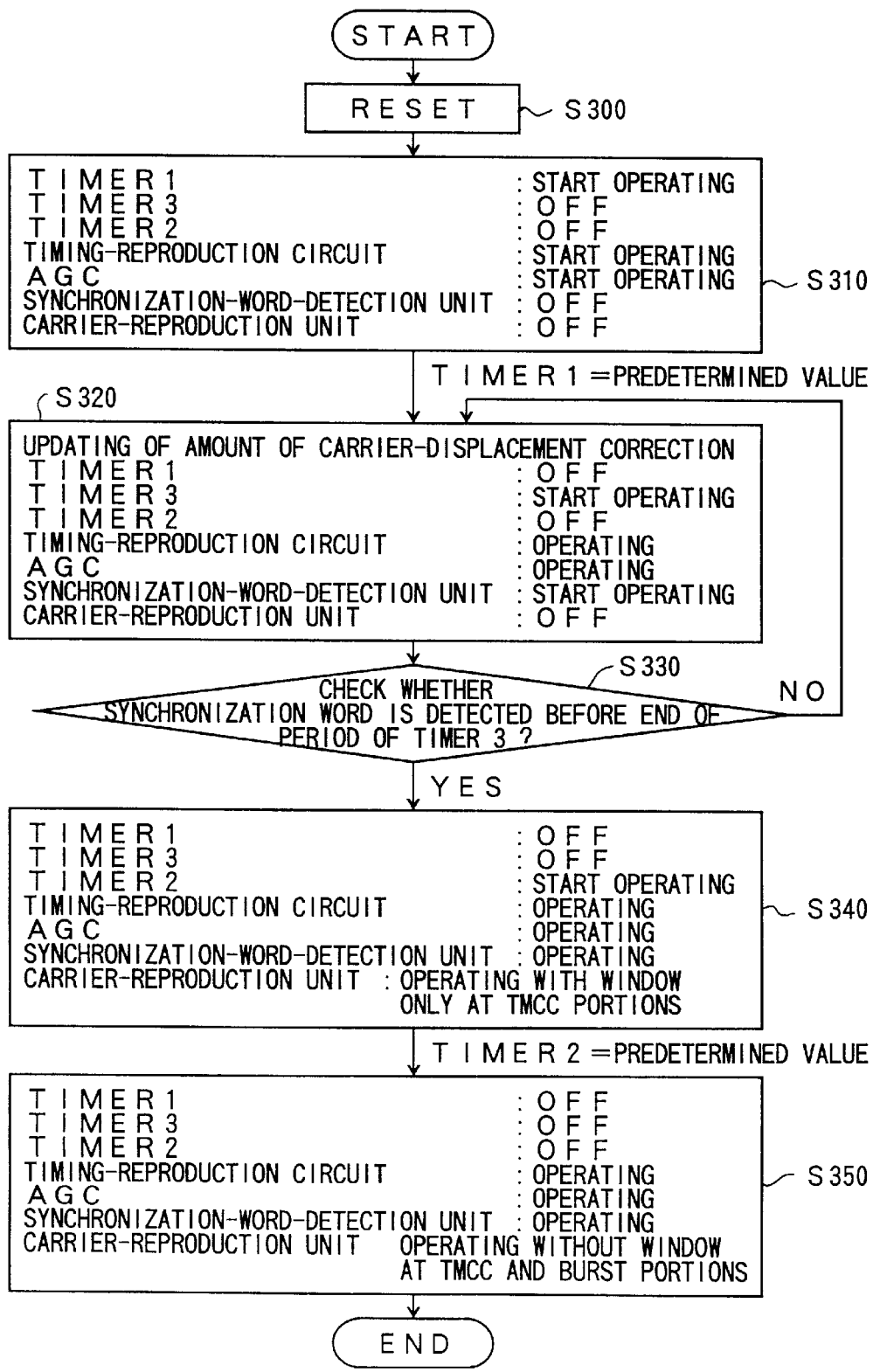
FIG. 14 is a flowchart showing operation of the digital-signal demodulation circuit of FIG. 13.
Figure 15:
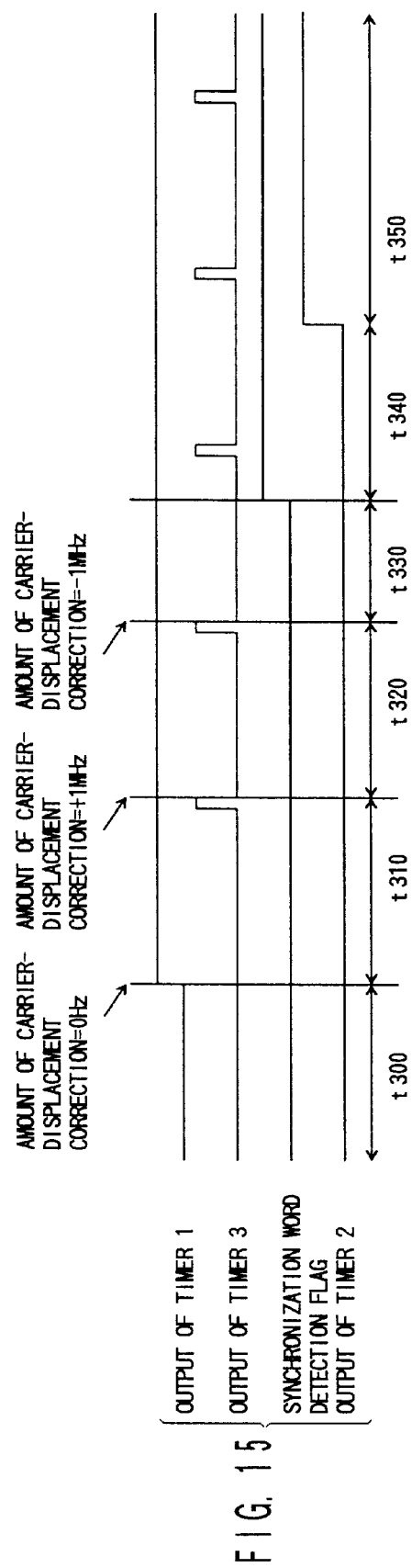
FIG. 15 is a timing chart for explaining operation of the digital-signal demodulation circuit of FIG. 13.

FIG. 13 is a circuit diagram of a digital-signal demodulation circuit according to a third embodiment of the present invention. FIG. 14 is a flowchart showing operation of the digital-signal demodulation circuit of FIG. 13. FIG. 15 is a timing chart for explaining the operation of the digital-signal demodulation circuit of FIG. 13.

In FIG. 13, the same elements as those of FIG. 3 are referred to by the same numerals, and a description thereof will be omitted.

The circuit of FIG. 13 includes a frequency-displacement-correction unit 30, a timer 35, an AND circuit 37, and a NOT circuit 38 in addition to the configuration of FIG. 3. The frequency-displacement-correction unit 30 includes a complex multiplying unit 31, a sin-and-cos table 32, a number-controlled oscillator 33, and a correction-amount-calculation unit 34.

The circuit of FIG. 13 is first reset as to the entire operation thereof, and wait in a standby state (step S300). An amount of carrier-frequency-displacement correction is set to zero in the correction-amount-calculation unit 34, a detail of which will be described later. Thereafter, magnitude adjustment and timing reproduction are performed much in the same manner as in the first embodiment (step S310). This process corresponds to a time period t300 in the timing chart of FIG. 15.

The timer 14 supplies an enable signal to the synchronization-word-detection unit 13 at an end of a time period during which the magnitude adjustment and timing reproduction are performed. A length of such a time period is determined in advance through simulations or the like. The timer 35 then starts counting time to detect an end of a predetermined time period (S320). The synchronization-word-detection unit 13 receives the I and Q digital signals from the timing-reproduction circuit 3, and starts detecting the synchronization words 1 and 2. This process corresponds to a time period t310 in the timing chart of FIG. 15.

A procedure after this point will vary depending on whether the synchronization-word-detection unit 13 detects the synchronization words 1 and 2 before the end of the predetermined time period (step S330). If the synchronization-word-detection unit 13 detects the synchronization words 1 and 2 before the timer 35 counts the end of the predetermined time period, the synchronization-word-detection unit 13 supplies a high synchronization-detection signal to the AND circuit 37 via the NOT circuit 38.

As a result, the AND circuit 37 does not output a high pulse signal when the timer 35 supplies the high pulse signal to the AND circuit 37 at the end of the counted time period. The correction-amount-calculation unit 34 thus keeps a value thereof unchanged where the value indicates the amount of carrier-frequency-displacement correction. Thereafter, the circuit of FIG. 13 performs steps S340 and S350. Here, the steps S340 and S350 are the same as the steps S230 and S240 of FIG. 8.

If the synchronization-word-detection unit 13 does not detect the synchronization words 1 and 2 before the timer 35 counts the end of the predetermined time period, the synchronization-word-detection unit 13 supplies a low synchronization-detection signal to the AND circuit 37 via the NOT circuit 38.

As a result, the AND circuit 37 provides a high pulse signal to the correction-amount-calculation unit 34 when the timer 35 supplies the high pulse signal to the AND circuit 37 at the end of the counted time period (step S320). The correction-amount-calculation unit 34 updates the amount of carrier-frequency-displacement correction according to pre-scribed rules, and the timer 35 is reset.

The amount of carrier-frequency-displacement correction may be updated successively in such an order as +1 MHz, −1 MHz, +2 MHz, −2 MHz, and so on if the synchronization-word-detection unit 13 has a frequency-displacement-detection capacity of ±1 MHz.

The timing chart of FIG. 15 shows an example in which the amount of carrier-frequency-displacement correction is updated from +1 MHz to −1 MHz and the synchronization-word-detection unit 13 detects the synchronization words 1 and 2 during the time period t330 before the end of the predetermined time period is counted by the timer 35.

In the following, a fourth embodiment of the present invention will be described.

Figure 16:
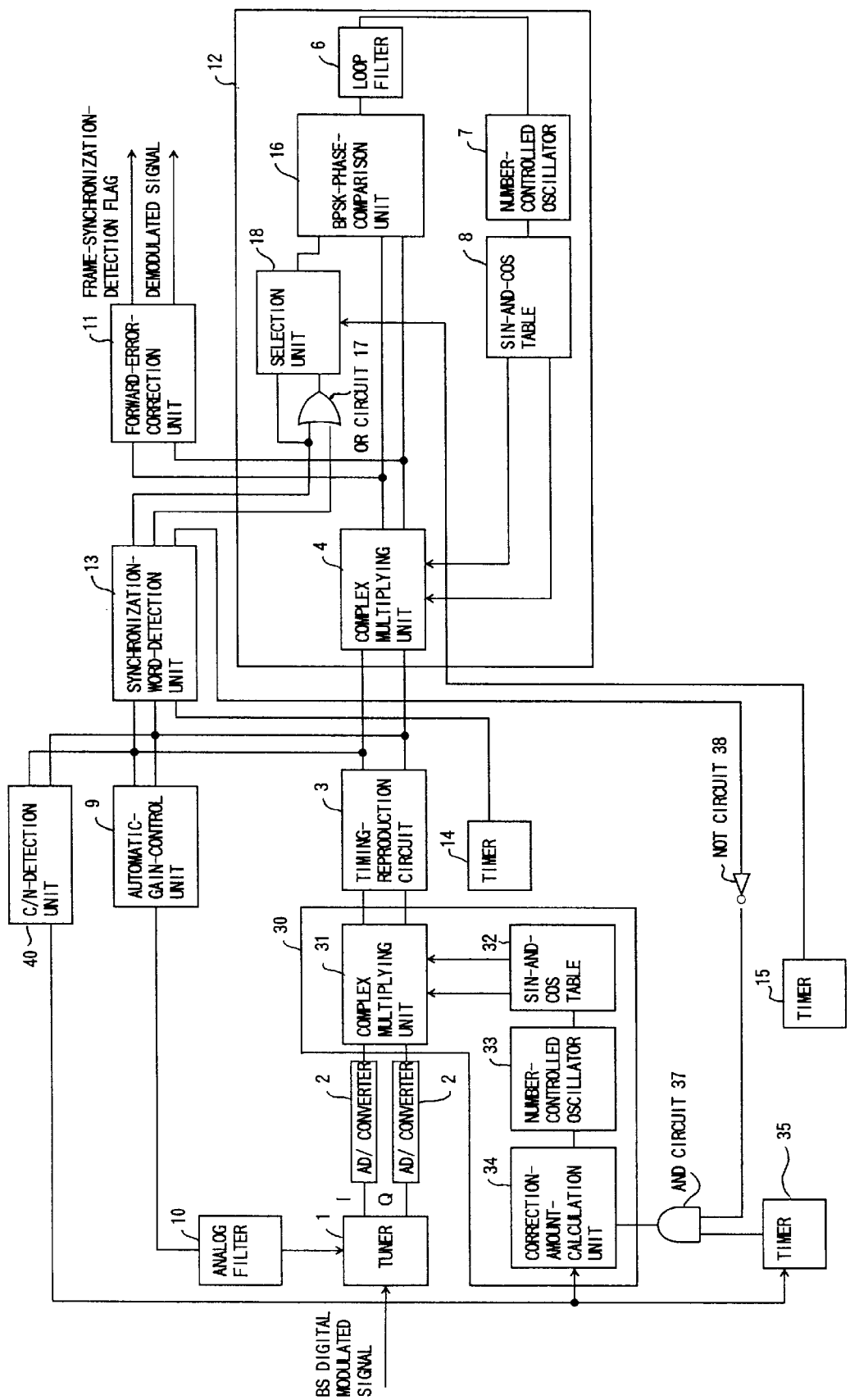
FIG. 16 is a circuit diagram of a digital-signal demodulation circuit according to a fourth embodiment of the present invention.
Figure 17:
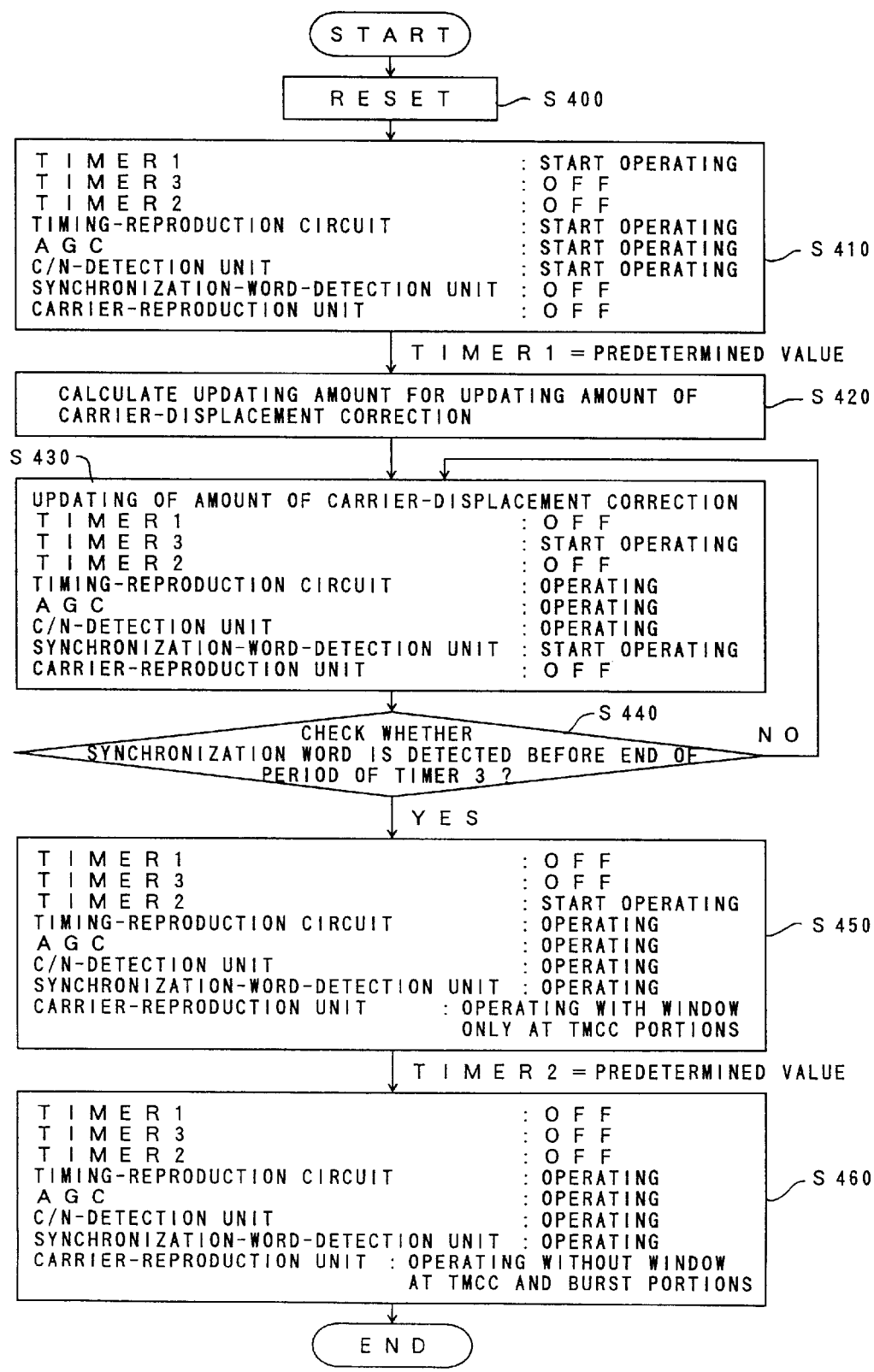
FIG. 17 is a flowchart showing operation of the digital-signal demodulation circuit of FIG. 16.

FIG. 16 is a circuit diagram of a digital-signal demodulation circuit according to a fourth embodiment of the present invention. FIG. 17 is a flowchart showing operation of the digital-signal demodulation circuit of FIG. 16. FIG. 18 is a timing chart for explaining the operation of the digital-signal demodulation circuit of FIG. 16.

In FIG. 16, the same elements as those of FIG. 13 are referred to by the same numerals, and a description thereof will be omitted.

The circuit of FIG. 16 differs from the circuit of FIG. 13 only in that a C/N-detection unit 40 is provided.

Figure 19:
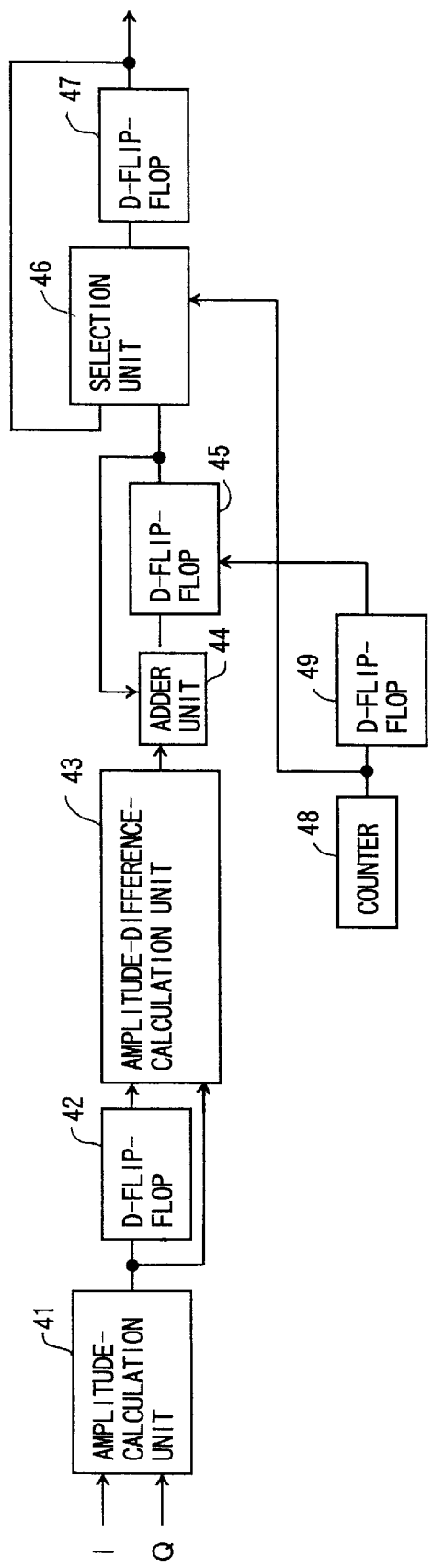
FIG. 19 is a circuit diagram of a C/N-detection unit.

FIG. 19 is a circuit diagram of the C/N-detection unit 40.

As shown in FIG. 19, the C/N-detection unit 40 includes an amplitude-calculation unit 41, a D-flip-flop 42, an amplitude-difference-calculation unit 43, an adder unit 44, a D-flip-flop 45, a selection unit 46, a D-flip-flop 47, a counter 48, and a D-flip-flop 49.

The amplitude-calculation unit 41 calculates a symbol amplitude of I and Q digital signals when receiving the I and Q digital signals. The amplitude-calculation unit 41 supplies the calculated symbol amplitude to the amplitude-difference-calculation unit 43 directly. The amplitude-calculation unit 41 also supplies the calculated symbol amplitude to the amplitude-difference-calculation unit 43 via the D-flip-flop 42.

The amplitude-difference-calculation unit 43 calculates an amplitude difference between the symbol amplitude supplied from the amplitude-calculation unit 41 and the symbol amplitude supplied from the D-flip-flop 42 where the symbol amplitude supplied from the D-flip-flop 42 represents a symbol amplitude one symbol before the current symbol. The amplitude difference is output to the adder unit 44. The adder unit 44 and the D-flip-flop 45 sums up the amplitude differences supplied from the amplitude-difference-calculation unit 43. A result of the summation is supplied to the D-flip-flop 47 via the selection unit 46 each time the counter 48 detects an end of a cycle having a predetermined time length. Also, the D-flip-flop 45 is reset at the end of each cycle. The D-flip-flop 47 updates a result of summation stored therein when the counter 48 outputs a high signal, and keeps a result of summation stored therein when the counter 48 supplies a low signal.

Accordingly, the C/N-detection unit 40 outputs a summation of absolute values of amplitude differences at constant intervals where each of the amplitude differences is a difference between a current symbol amplitude and an immediately preceding symbol amplitude. As a result, the smaller the C/N values of the symbols of the I and Q digital signals (i.e., the larger the noise), the larger the magnitude of the output signal will be.

The circuit of FIG. 16 is first reset as to the entire operation thereof, and wait in a standby state (step S400). An amount of carrier-frequency-displacement correction is set to zero in the correction-amount-calculation unit 34. Thereafter, magnitude adjustment and timing reproduction are performed much in the same manner as in the third embodiment (step S410). This process corresponds to a time period t400 in the timing chart of FIG. 18.

The timer 14 supplies an enable signal to the synchronization-word-detection unit 13 at an end of a time period during which the magnitude adjustment and timing reproduction are performed. A length of such a time period is determined in advance through simulations or the like. At this point of time, the signal output from the C/N-detection unit 40 is stable, so that the correction-amount-calculation unit 34 obtains an update of a correction amount of the carrier frequency displacement by using the signal output from the C/N-detection unit 40 (step S420).

The timer 35 then starts counting time to detect an end of a predetermined time period. The synchronization-word-detection unit 13 receives the I and Q digital signals from the timing-reproduction circuit 3, and starts detecting the synchronization 1 and 2 (step S430). This process corresponds to a time period t410 in the timing chart of FIG. 18.

A procedure after this point will vary depending on whether the synchronization-word-detection unit 13 detects the synchronization words 1 and 2 before the end of the predetermined time period (step S440). If the synchronization-word-detection unit 13 detects the synchronization words 1 and 2 before the timer 35 counts the end of the predetermined time period, the AND circuit 37 does not output a high pulse signal, thereby letting the correction-amount-calculation unit 34 keep a value thereof unchanged where the value indicates the amount of carrier-frequency-displacement correction. Thereafter, the circuit of FIG. 16 performs steps S450 and S460. Here, the steps S450 and S460 are the same as the steps S340 and S350 of FIG. 14.

If the synchronization-word-detection unit 13 does not detect the synchronization words 1 and 2 before the timer 35 counts the end of the predetermined time period, the AND circuit 37 provides a high pulse signal to the correction-amount-calculation unit 34. The correction-amount-calculation unit 34 updates the amount of carrier-frequency-displacement correction according to the following formula, and the timer 35 is reset.

$$\text{Amount of Carrier-Frequency-Displacement Correction} = (-1)^n \times \text{Updated Correction Amount} \quad (1)$$

$$(n=0, 1, 2, \ldots)$$

The timing chart of FIG. 18 shows an example in which the amount of carrier-frequency-displacement correction is updated twice, and the synchronization-word-detection unit 13 detects the synchronization words 1 and 2 during the time period t430 before the end of the predetermined time period is counted by the timer 35.

In the following, a fifth embodiment of the present invention will be described.

Figure 20:
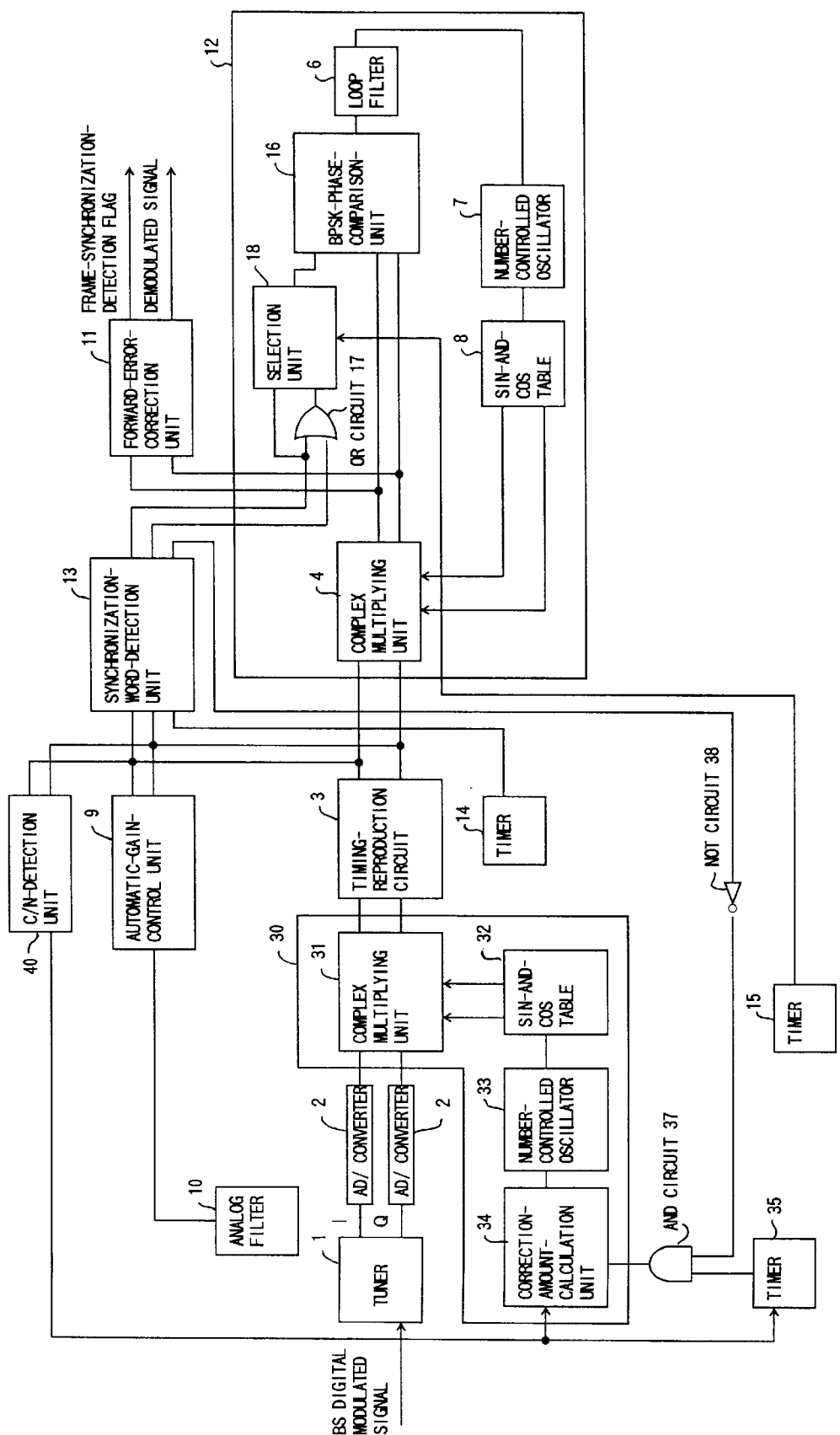
FIG. 20 is a circuit diagram of a digital-signal demodulation circuit according to a fifth embodiment of the present invention.
Figure 21:
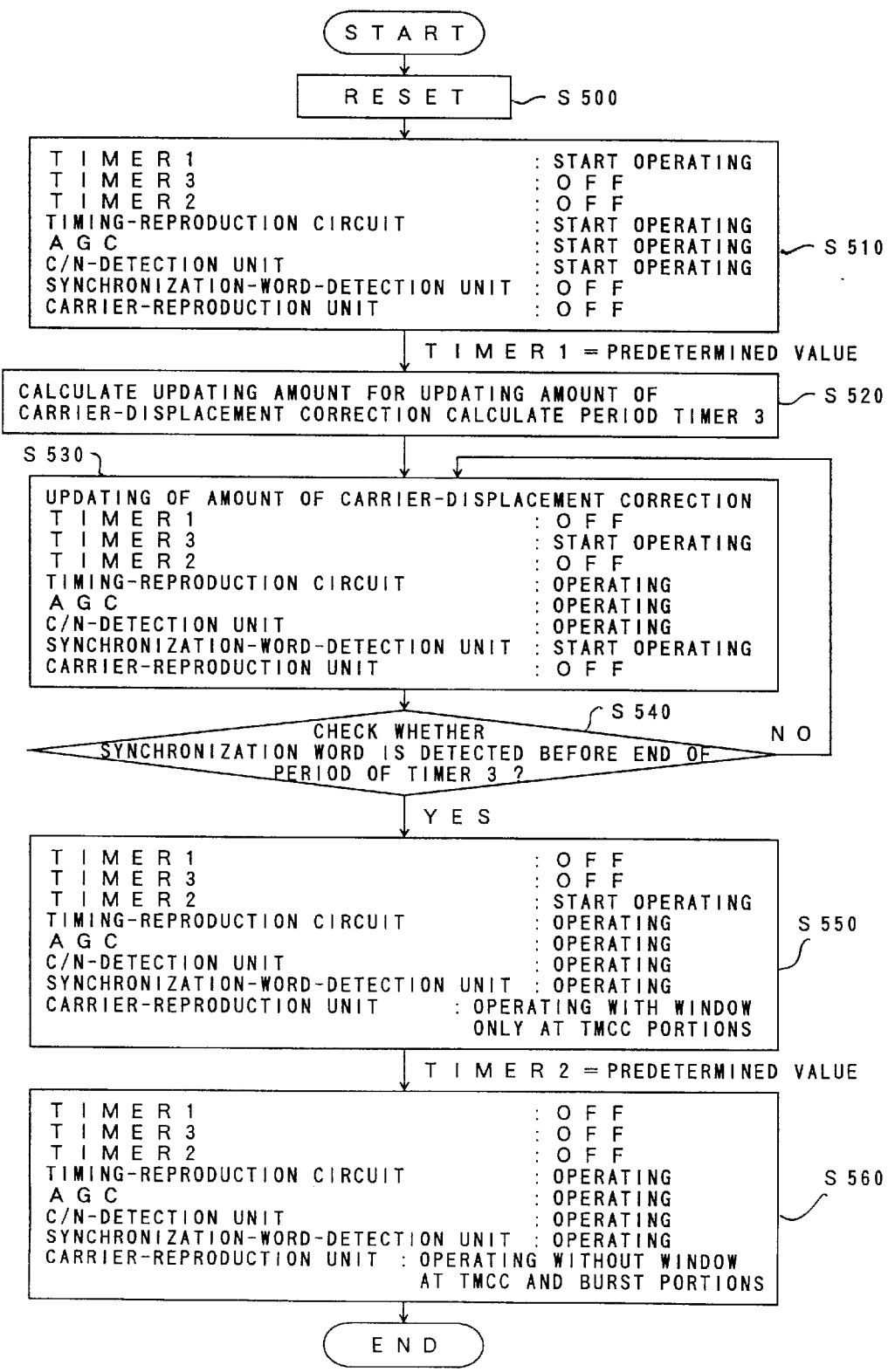
FIG. 21 is a flowchart showing operation of the digital-signal demodulation circuit of FIG. 20.

FIG. 20 is a circuit diagram of a digital-signal demodulation circuit according to a fifth embodiment of the present invention. FIG. 21 is a flowchart showing operation of the digital-signal demodulation circuit of FIG. 20. FIG. 22 is a timing chart for explaining the operation of the digital-signal demodulation circuit of FIG. 20.

The configuration of the fifth embodiment shown in FIG. 20 is identical to that of the fourth embodiment shown in FIG. 16. In FIG. 20, the same elements as those of FIG. 16 are referred to by the same numerals, and a description thereof will be omitted.

The circuit of FIG. 20 is first reset as to the entire operation thereof, and wait in a standby state (step S500). An amount of carrier-frequency-displacement correction is set to zero in the correction-amount-calculation unit 34. Thereafter, magnitude adjustment and timing reproduction are performed much in the same manner as in the fourth embodiment (step S510). This process corresponds to a time period t500 in the timing chart of FIG. 22.

The timer 14 supplies an enable signal to the synchronization-word-detection unit 13 at an end of a time period during which the magnitude adjustment and timing reproduction are performed. A length of such a time period is determined in advance through simulations or the like. At this point of time, the signal output from the C/N-detection unit 40 is stable, so that the correction-amount-calculation unit 34 obtains an update of a correction amount of the carrier frequency displacement as well as an updating cycle of the correction amount of the carrier frequency displacement by using the signal output from the C/N-detection unit 40 (step S520). Here, the updating cycle of the carrier frequency displacement is the time period that is to be counted by the timer 35.

The larger the magnitude of the signal supplied from the C/N-detection unit 40, the smaller the update of the correction amount of the carrier frequency displacement, and, also, the larger the updating cycle of the correction amount of the carrier frequency displacement. Namely, when the C/N value is relatively large, the updating cycle is set to a relatively short period, thereby achieving high-speed processing. When the C/N value is relatively small, on the other hand, the updating cycle is set to a relatively long time period, thereby ensuring a reliable synchronization-word detection. A procedure after the step S530 is the same as that of the fourth embodiment shown in FIG. 17, and a description thereof will be omitted.

In the following, a sixth embodiment of the present invention will be described.

FIG. 23 is a circuit diagram of a digital-signal demodulation circuit according to a sixth embodiment of the present invention.

The circuit of FIG. 23 differs from that of FIG. 20 in that a BPSK˙QPSK˙8PSK-phase-comparison unit 50 is newly provided. Here, the OR circuit 17 and the selection unit 18 shown in FIG. 20 are included in the BPSK˙QPSK˙8PSK-phase-comparison unit 50 in the configuration of FIG. 23.

FIG. 24 is a circuit diagram of the BPSK˙QPSK˙8PSK-phase-comparison unit 50.

The BPSK˙QPSK˙8PSK-phase-comparison unit 50 of FIG. 24 includes the OR circuit 17, the selection unit 18, an OR circuit 53, an 8PSK-phase-comparison unit 54, a QPSK-phase-comparison unit 55, the BPSK-phase-comparison unit 20, the window-check unit 21, multiplication units 58 and 59, the multiplication unit 22, D-flip-flops 61 and 62, the D-flip-flop 24, the selection unit 23, and an adder unit 65.

Figure 25:
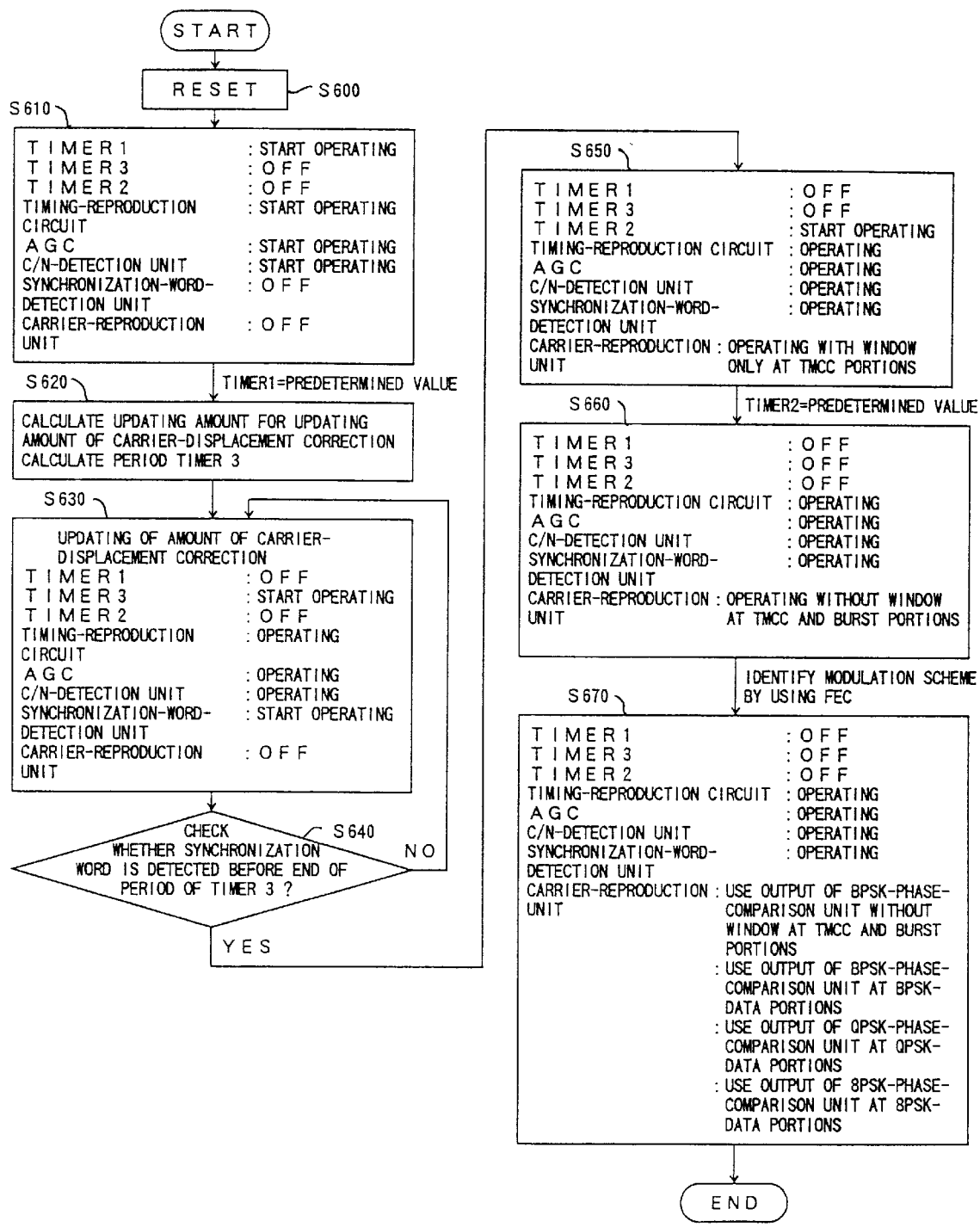
FIG. 25 is a flowchart showing operation of the digital-signal demodulation circuit of FIG. 23.
Figure 26:
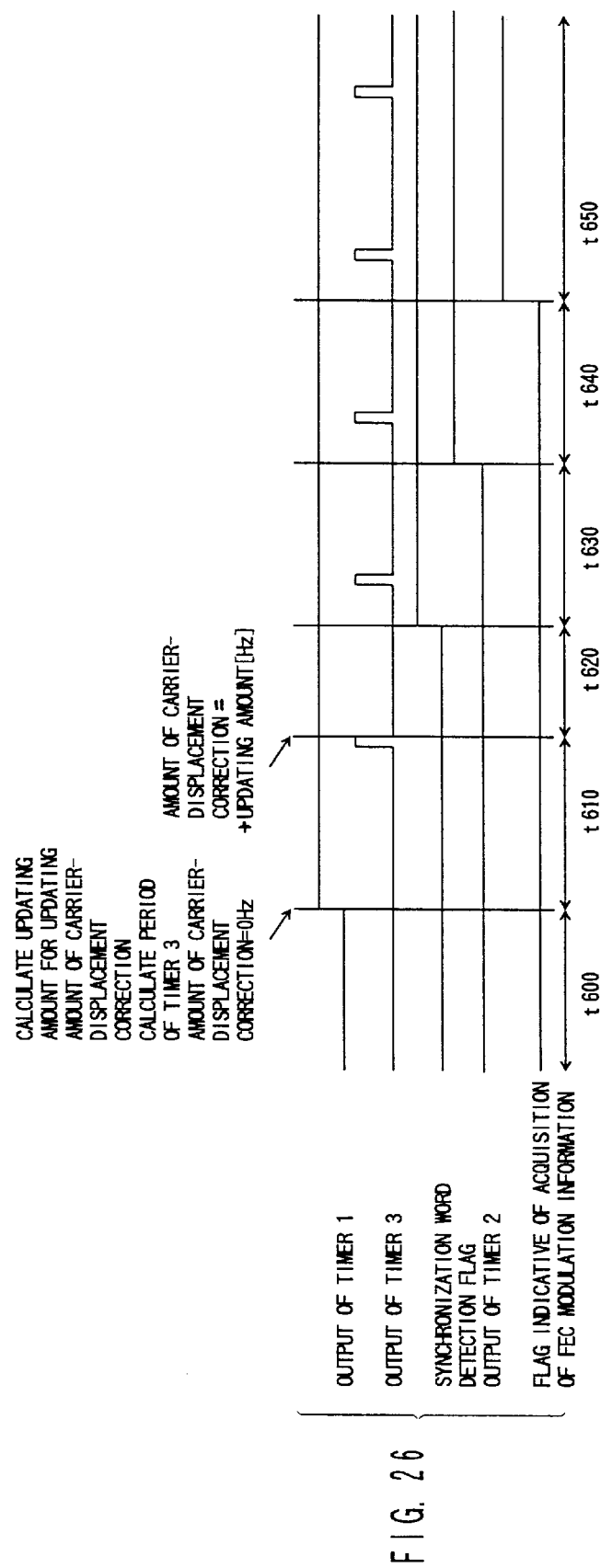
FIG. 26 is a timing chart for explaining operation of the digital-signal demodulation circuit of FIG. 23.

FIG. 25 is a flowchart showing operation of the digital-signal demodulation circuit of FIG. 23. FIG. 26 is a timing chart for explaining the operation of the digital-signal demodulation circuit of FIG. 23.

The circuit of FIG. 23 operates in the same fashion as the circuit of FIG. 20 from a step S600 to a step S660, and a description of this identical portion of the operation will be omitted.

After frequency capturing and phase capturing are completed through the steps S600 through S660, the forward-error-correction unit 11 obtains control information on switching of modulation schemes. The forward-error-correction unit 11 supplies switching control signals on the modulation-scheme-wise basis to the BPSK˙QPSK˙8PSK-phase-comparison unit 50 (step S670). For example, a switching control signal for the 8PSK modulation scheme becomes high only when this modulation scheme is employed, and a switching control signal for the QPSK modulation scheme becomes high only when the QPSK modulation scheme is employed. Further, a switching control signal for the BPSK modulation scheme becomes high only when the BPSK modulation scheme is employed. In this manner, the forward-error-correction unit 11 serves as a modulation-scheme-check unit to check the currently employed modulation scheme.

The switching control signal for the 8PSK is supplied to the multiplication unit 58. When the switching control signal for the 8PSK is high, i.e., when the 8PSK modulation scheme is employed, an output of the 8PSK-phase-comparison unit 54 is supplied to the D-flip-flop 61. When the switching control signal for the 8PSK is low, i.e., when the 8PSK modulation scheme is not employed, a zero signal is supplied to the D-flip-flop 61.

The switching control signal for the QPSK is supplied to the multiplication unit 59. When the switching control signal for the QPSK is high, i.e., when the QPSK modulation scheme is employed, an output of the QPSK-phase-comparison unit 55 is supplied to the D-flip-flop 62. When the switching control signal for the QPSK is low, i.e., when the QPSK modulation scheme is not employed, a zero signal is supplied to the D-flip-flop 62.

The switching control signal for the BPSK is supplied to the multiplication unit 22. When the switching control signal for the BPSK is high, i.e., when the BPSK modulation scheme is employed, an output of the BPSK-phase-comparison unit 20 is supplied to the D-flip-flop 24. When the switching control signal for the BPSK is low, i.e., when the BPSK modulation scheme is not employed, a zero signal is supplied to the D-flip-flop 24. Outputs of the D-flip-flops 24, 61, and 62 are added together by the adder unit 65, and the sum is supplied to the loop filter 6. This process corresponds to a period t650 in the timing chart of FIG. 26.

In this manner, the BPSK˙QPSK˙8PSK-phase-comparison unit 50 utilizes the switching control signals to select a phase-comparison unit that matches the modulation scheme of the currently processed I and Q digital signals.

In the following, a seventh embodiment of the present invention will be described.

Figure 27:
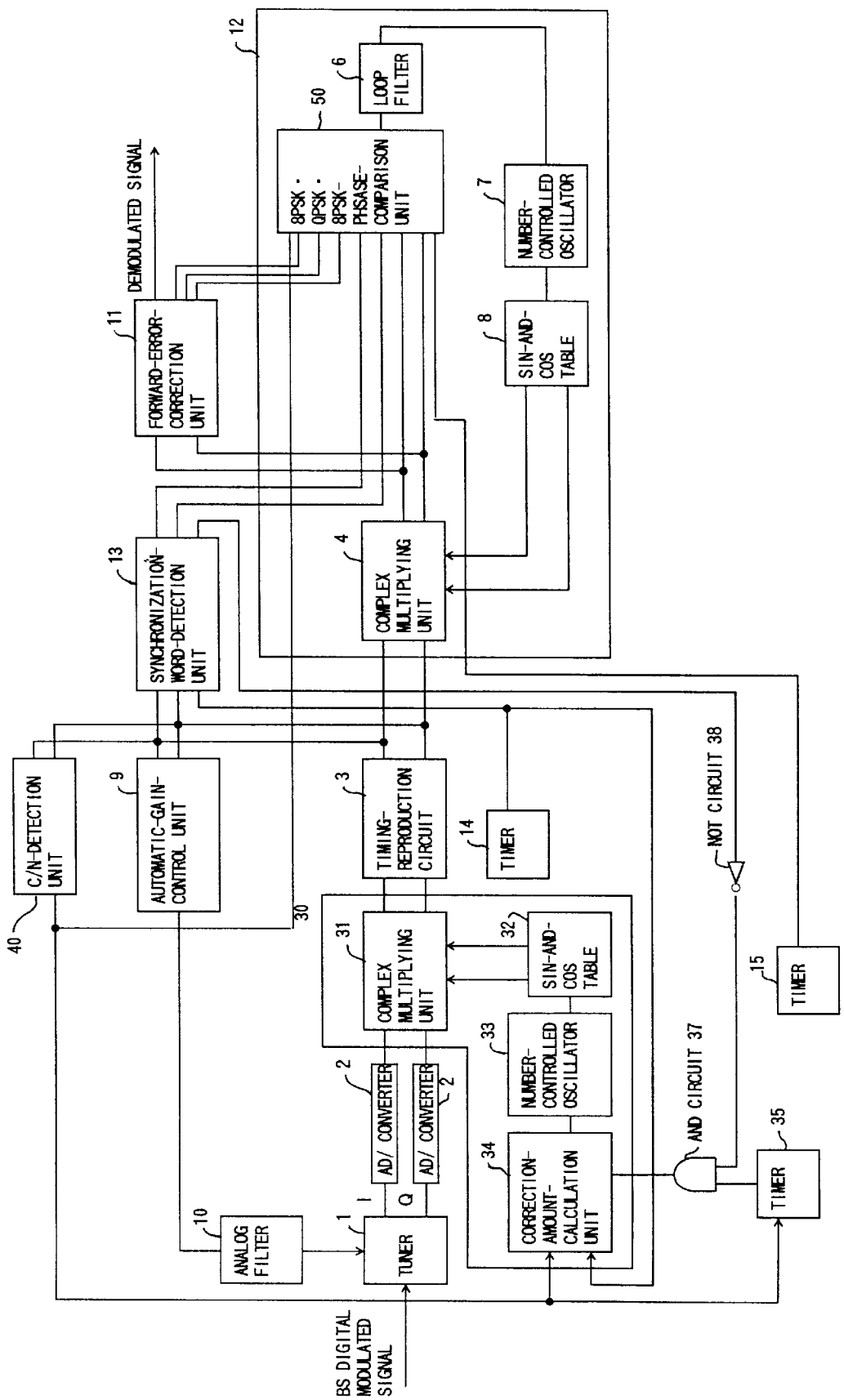
FIG. 27 is a circuit diagram of a digital-signal demodulation circuit according to a seventh embodiment of the present invention.
Figure 28:
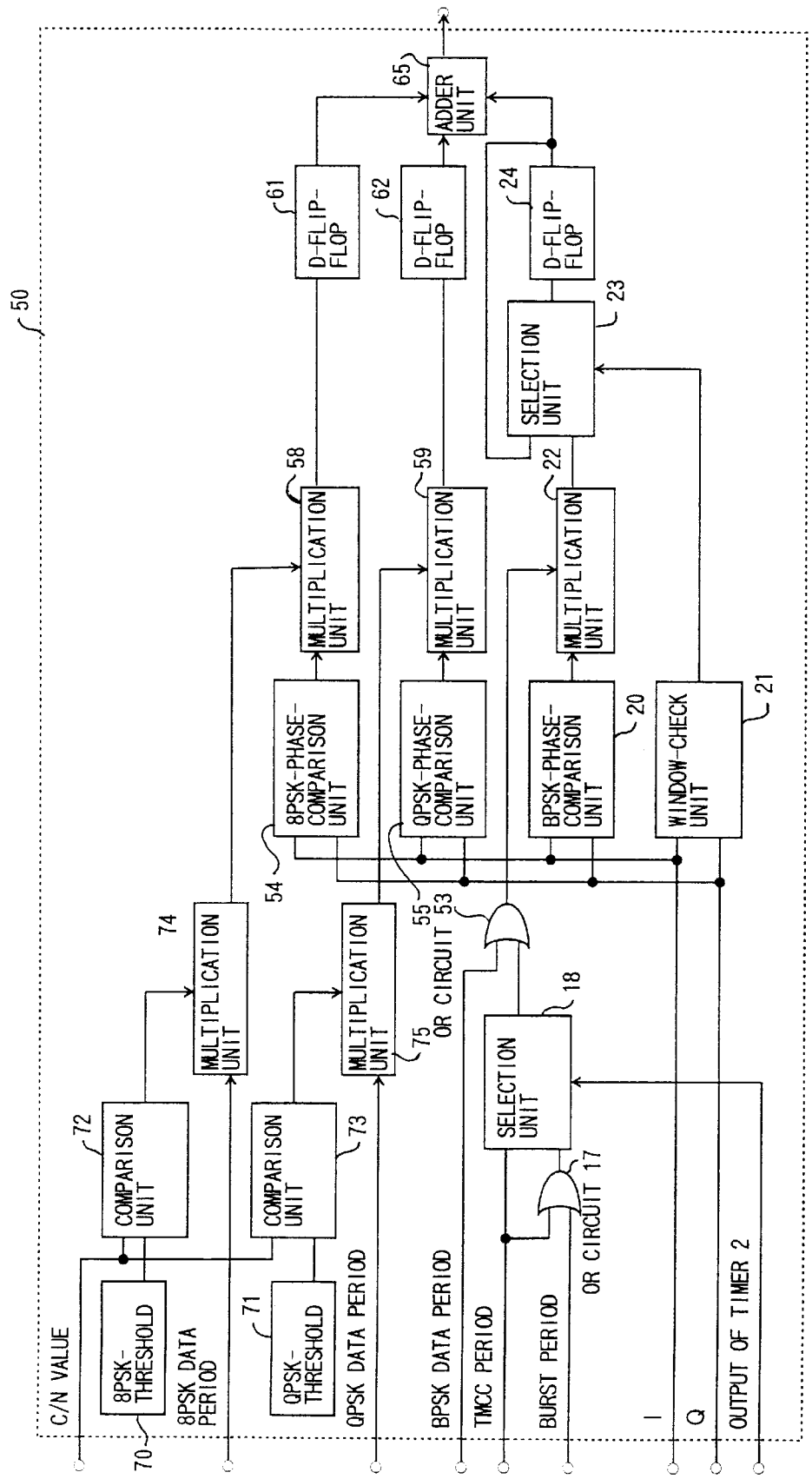
FIG. 28 is a circuit diagram of a BPSK·QPSK·8PSK-phase-comparison unit of FIG. 27.
Figure 29:
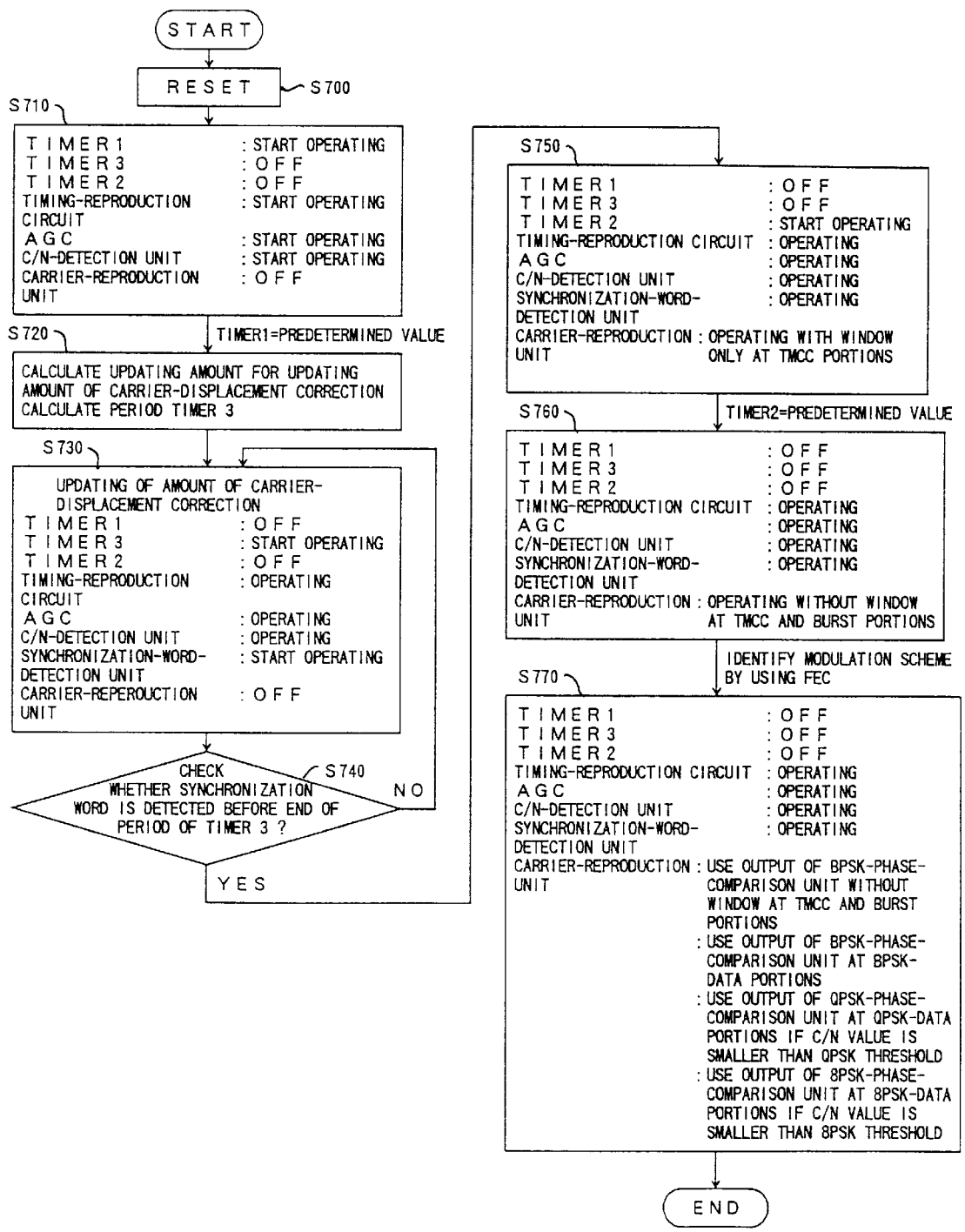
FIG. 29 is a flowchart showing operation of the digital-signal demodulation circuit of FIG. 27.

FIG. 27 is a circuit diagram of a digital-signal demodulation circuit according to a seventh embodiment of the present invention. FIG. 28 is a circuit diagram of a BPSK˙QPSK˙8PSK-phase-comparison unit of FIG. 27. FIG. 29 is a flowchart showing operation of the digital-signal demodulation circuit of FIG. 27. FIG. 30 is a timing chart for explaining the operation of the digital-signal demodulation circuit of FIG. 27. The configuration of the seventh embodiment shown in FIG. 27 is almost the same as that of FIG. 23. In FIG. 27, the same elements as those of FIG. 23 are referred to by the same numerals, and a description thereof will be omitted.

The circuit of FIG. 27 differs from that of FIG. 23 only in that the output signal of the C/N-detection unit 40 is supplied to a BPSK·QPSK·8PSK-phase-comparison unit 50A provided in place of the BPSK·QPSK·8PSK-phase-comparison unit 50. As shown in FIG. 28, the BPSK·QPSK·8PSK-phase-comparison unit 50A includes an 8PSK-threshold setting unit 70, a QPSK-threshold setting unit 71, a comparison unit 72, a comparison unit 73, and multiplication units 74 and 75.

The circuit of FIG. 27 operates in the same fashion as the circuit of FIG. 23 from a step S700 to a step S760, and a description of this identical portion of the operation will be omitted.

After frequency capturing and phase capturing are completed through the steps S700 through S760, the forward-error-correction unit 11 obtains control information on switching of modulation schemes. The forward-error-correction unit 11 then supplies switching control signals on the modulation-scheme-wise basis to the BPSK·QPSK·8PSK-phase-comparison unit 50A. Further, the C/N-detection unit 40 supplies the output signal thereof to the comparison units 72 and 73 (step S770).

The comparison unit 72 compares the output signal of the C/N-detection unit 40 with an 8PSK threshold value supplied from the 8PSK-threshold setting unit 70, and supplies a high signal to the multiplication unit 74 when the output signal of the C/N-detection unit 40 is smaller than the 8PSK threshold value. When the output signal of the C/N-detection unit 40 exceeds the 8PSK threshold value, on the other hand, the comparison unit 72 supplies a low signal to the multiplication unit 74.

Accordingly, the multiplication unit 74 supplies the 8PSK switching signal (the switching control signal for the 8PSK) from the forward-error-correction unit 11 to the multiplication unit 58 only when the output signal of the C/N-detection unit 40 is smaller than the 8PSK threshold value. This arrangement is made because of the following reason. The 8PSK-threshold setting unit 70 sets the 8PSK threshold value to an upper limit where the 8PSK modulation signal becomes no longer useful for the synchronization purpose. When the output signal of the C/N-detection unit 40 exceeds the 8PSK threshold value, the 8PSK modulation signal is useless for the purpose of maintaining synchronization if not detrimental to this end.

The comparison unit 73 compares the output signal of the C/N-detection unit 40 with a QPSK threshold value supplied from the QPSK-threshold setting unit 71, and supplies a high signal to the multiplication unit 75 when the output signal of the C/N-detection unit 40 is smaller than the QPSK threshold value. When the output signal of the C/N-detection unit 40 exceeds the QPSK threshold value, on the other hand, the comparison unit 73 supplies a low signal to the multiplication unit 75.

Accordingly, the multiplication unit 75 supplies the QPSK switching signal (the switching control signal for the QPSK) from the forward-error-correction unit 11 to the multiplication unit 59 only when the output signal of the C/N-detection unit 40 is smaller than the QPSK threshold value. This arrangement is made because of the following reason. The QPSK-threshold setting unit 71 sets the QPSK threshold value to an upper limit where the QPSK modulation signal becomes no longer useful for the synchronization purpose. When the output signal of the C/N-detection unit 40 exceeds the QPSK threshold value, the QPSK modulation signal is useless for the purpose of maintaining synchronization if not detrimental to this end. This process corresponds to a period t750 in the timing chart of FIG. 30.

In this manner, the BPSK·QPSK·8PSK-phase-comparison unit 50A selects a modulation signal according to the C/N value for the purpose of using the selected modulation signal for maintaining synchronization. This makes it possible to the maintain synchronization until the C/N value becomes relatively low.

The digital-signal demodulation circuits of the embodiments described above are applicable to a digital-signal receiver.

FIG. 31 is a block diagram of a digital-signal receiver to which the digital-signal demodulation circuit of the present invention is applicable. In a digital-signal receiver 80 of FIG. 31, the digital-signal demodulation circuit of the present invention corresponds to a block 81 comprised of a QPSK 82 and an error correction 83.

The above embodiments have been described with reference to a case where BS digital broadcast signals are supplied. The present invention is not limited to this specific case, but is applicable to cases where any signal having a mixture of different modulation schemes is to be demodulated.

Further, the present invention is not limited to these embodiments, but various variations and modifications may be made without departing from the scope of the present invention.

The present application is based on Japanese priority application No. 11-013430 filed on Jan. 21, 1999, with the Japanese Patent Office, the entire contents of which are hereby incorporated by reference.

What is claimed is:

1. A circuit for demodulating a signal having a temporal mixture of different modulation schemes applied thereto, comprising:

a synchronization-word-detection unit which detects synchronization words included in the signal, and generates first and second position signals, based on the detected synchronization words, indicative of respective predetermined positions in the signal;

a first selection unit which selects the first position signals during a first period, and selects the first position signals and the second position signals during a second period; and a carrier-reproduction unit which carries out frequency capturing during the first period by using the first position signals selected by the first selection unit, and carries out phase capturing during the second period by using the first position signals and the second position signals selected by the first selection unit, thereby reproducing a carrier.

2. The circuit as claimed in claim 1, further comprising:

a timing-reproduction unit which attends to timing reproduction of the signal;

a first timer which instructs said synchronization-word-detection unit to start operation thereof after passage of a time period that is needed for a completion of the timing reproduction of the signal;

second timer which notifies the first selection unit of a change from the first period to the second period after passage of a time period that is needed for a completion of the frequency capturing.

3. The circuit as claimed in claim 1, wherein said carrier-reproduction unit includes a window-check unit which checks, during the first period, whether a current phase difference of the signal falls within a predetermined range, said window-check unit outputting the current phase difference if the current phase difference falls within the predetermined range and outputting a previous phase difference that was last detected before the current phase difference got out of the predetermined range.

4. The circuit as claimed in claim 3, further comprising:
  a frequency-displacement-correction unit which determines an amount of carrier-frequency-displacement correction;
  a third timer which counts an update time period; and
  a second selection unit which instructs said frequency-displacement-correction unit to update the amount of carrier-frequency-displacement correction at an end of the update time period when said synchronization-word-detection unit does not detect the synchronization words by the end of the update time period.

5. The circuit as claimed in claim 4, further comprising a C/N-detection unit which detects a C/N value of the signal, wherein said frequency-displacement-correction unit determines the amount of carrier-frequency-displacement correction based on the C/N value.

6. The circuit as claimed in claim 5, wherein said third timer changes the update time period according to the C/N value.

7. The circuit as claimed in claim 6, wherein said C/N value comprises:
  an amplitude-calculation unit which obtains an amplitude of the signal;
  amplitude-difference-calculation unit which calculates an amplitude difference between a current amplitude of the signal and a previous amplitude of the signal;
  an adder unit which adds up the amplitude difference over time to obtain a sum of amplitude differences; and
  a third selection unit which outputs the sum of amplitude differences at constant intervals.

8. The circuit as claimed in claim 7, further comprising:
  a modulation-scheme-check unit which identifies, after an end of the carrier reproduction, a modulation scheme that is currently applied to the signal; and
  a phase-comparator-selection unit which selects one of phase comparators that corresponds to the identified modulation scheme.

9. The circuit as claimed in claim 8, wherein said phase-comparator-selection unit has threshold values set for the respective modulation schemes, and compares the C/N value with the threshold values so as to determine whether to use a given modulation scheme for a purpose of maintaining synchronization.

10. The circuit as claimed in claim 1, wherein the modulation schemes include BPSK, QPSK, and 8PSK.

11. The circuit as claimed in claim 10, wherein the predetermined positions in the signal are modulated by the BPSK.

12. The circuit as claimed in claim 11, wherein one of the predetermined positions in the signal includes the synchronization words and control information about switching of the modulation schemes.

13. A method for demodulating a signal having a temporal mixture of different modulation schemes applied thereto, comprising the steps of:
  detecting synchronization words included in the signal;
  generating first and second position signals, based on the detected synchronization words, indicative of respective predetermined positions in the signal;
  selecting the first position signals during a first period, and selects the first position signals and the second position signals during a second period; and
  carrying out frequency capturing during the first period by using the first position signals selected said step of selecting, and carries out phase capturing during the second period by using the first position signals and the second position signals selected by said step of selecting.

* * * * *